US010756604B2

(12) United States Patent
Wang et al.

(10) Patent No.: US 10,756,604 B2
(45) Date of Patent: Aug. 25, 2020

(54) INDUCTION SERVO MOTOR WITH A CONSTANT-OUTPUT-FORCE OR A CONSTANT-OUTPUT-TORQUE BY USING UNIFORM MAGNETIC FIELDS

(71) Applicants: Xiaoming Wang, Liaoning (CN); Yuanxiu Wang, Liaoning (CN); Yulin Mei, Liaoning (CN)

(72) Inventors: Xiaoming Wang, Liaoning (CN); Yuanxiu Wang, Liaoning (CN); Yulin Mei, Liaoning (CN)

( * ) Notice: Subject to any disclaimer, the term of this patent is extended or adjusted under 35 U.S.C. 154(b) by 386 days.

(21) Appl. No.: 15/564,925

(22) PCT Filed: Apr. 17, 2015

(86) PCT No.: PCT/CN2015/076863
§ 371 (c)(1),
(2) Date: Dec. 22, 2017

(87) PCT Pub. No.: WO2016/165121
PCT Pub. Date: Oct. 20, 2016

(65) Prior Publication Data
US 2018/0145570 A1    May 24, 2018

(51) Int. Cl.
*H02K 17/16* (2006.01)
*H02K 41/025* (2006.01)
(Continued)

(52) U.S. Cl.
CPC ............ *H02K 17/16* (2013.01); *H02K 17/04* (2013.01); *H02K 17/30* (2013.01); *H02K 41/025* (2013.01);
(Continued)

(58) Field of Classification Search
CPC ........ H02K 1/165; H02K 3/28; H02K 116/00; H02K 116/02; H02K 116/04;
(Continued)

(56) References Cited

U.S. PATENT DOCUMENTS

| 2014/0191624 A1* | 7/2014 | Jahshan | ................ | H02K 11/33 |
| | | | | 310/68 B |
| 2015/0214824 A1* | 7/2015 | Guina | .................... | H02K 55/06 |
| | | | | 310/113 |

(Continued)

FOREIGN PATENT DOCUMENTS

| CN | 2063716 U | 10/1990 |
| CN | 102921971 A | 2/2013 |
| RU | 2461947 C1 | 9/2012 |

*Primary Examiner* — Tulsidas C Patel
*Assistant Examiner* — Rashad H Johnson
(74) *Attorney, Agent, or Firm* — Muncy, Geissler, Olds & Lowe, P.C.

(57) ABSTRACT

The present invention belongs to the technical field of alternating current induction servo motors, and particularly relates to a rotary-type induction servo motor with a constant-output-torque by using uniform magnetic fields and a linear-type induction servo motor with a constant-output-force by using uniform magnetic fields. The present invention has main features that the rotary-type induction servo motor or the linear-type induction servo motor is composed of N independent motor units; each independent motor unit has the same or similar structure, and is powered by single-phase alternating current; and the N independent motor units have an equal voltage magnitude of power supply, but voltage phases are different and form an arithmetic progression. In an independent motor unit of the rotary-type induction servo motor with a constant-output-torque by using uniform magnetic fields, the stator magnetic conductive silicon steel is simple in structure, and the winding manner of stator excitation windings is simple, similar to a multi-layer solenoid type; rotor induction excitation windings are powered through induction, and no slip ring and related wearing parts are used. The rotary-type induction servo motor disclosed here can be operated at fixed voltage frequency, and in this case, the output torque and the voltage (Continued)

magnitude of power supply are in direct proportion, so the output torque can be controlled by adjusting the voltage magnitude. The motor does not adopt permanent magnetic materials, and has many merits including simple structure, good torque characteristic, simple controller design and high control precision. And meanwhile, based on the same principle, a linear-type induction servo motor with a constant-output-force by using uniform magnetic fields can be evolved from the rotary-type induction servo motor.

19 Claims, 7 Drawing Sheets

(51) Int. Cl.
| | | |
|---|---|---|
| H02K 17/04 | (2006.01) | |
| H02K 17/30 | (2006.01) | |
| H02K 16/00 | (2006.01) | |
| H02K 3/28 | (2006.01) | |
| H02K 16/04 | (2006.01) | |

(52) U.S. Cl.
CPC ............... *H02K 3/28* (2013.01); *H02K 16/00* (2013.01); *H02K 16/04* (2013.01)

(58) Field of Classification Search
CPC ...... H02K 116/05; H02K 17/04; H02K 17/16; H02K 17/30; H02K 41/025
USPC .... 310/40 R, 46, 156.01, 156.35, 179, 400.3
See application file for complete search history.

(56) References Cited

U.S. PATENT DOCUMENTS

| | | | | |
|---|---|---|---|---|
| 2015/0229173 | A1* | 8/2015 | Sromin | H02K 21/24 310/208 |
| 2016/0105062 | A1* | 4/2016 | Aoyama | H02K 1/24 310/51 |
| 2016/0105088 | A1* | 4/2016 | Narita | H02K 19/10 310/216.091 |
| 2016/0226356 | A1* | 8/2016 | Nashiki | H02K 21/042 |
| 2017/0098973 | A1* | 4/2017 | Shaw | H05K 1/0298 |

* cited by examiner

INDUCTION SERVO MOTOR WITH A CONSTANT-OUTPUT-FORCE OR A CONSTANT-OUTPUT-TORQUE BY USING UNIFORM MAGNETIC FIELDS

TECHNICAL FIELD

The present invention belongs to the technical field of induction motors, relates to alternating current induction servo motors, and particularly relates to a novel induction servo motor with a constant-output-force or a constant-output-torque by using uniform magnetic fields, which is based on a new design principle and can be classified into two types: a rotary-type induction servo motor with a constant-output-torque by using uniform magnetic fields and a linear-type induction servo motor with a constant-output-force by using uniform magnetic fields.

BACKGROUND

A servo motor is an electromagnetic mechanical device for electromechanical energy conversion, and its main feature is that the output torque or speed can be controlled rapidly and accurately. According to different requests for utilization and power supplies, servo motors can be classified into different categories, such as a direct current servo motor, an alternating current synchronous servo motor, an alternating current induction servo motor and the like.

The direct current servo motor has the advantages of good speed adjustability, high starting torque and simple control system, but it also has complicated structure, high manufacturing cost, high maintenance cost and poor reliability.

The alternating current synchronous servo motor has two structural forms. The first structural form is an alternating current permanent magnet synchronous servo motor. And its rotor produces a high-density permanent magnetic field through the use of permanent magnetic materials or scarce rare earth resources. The second structural form is an alternating current winding rotor synchronous servo motor. Its rotor produces a magnetic field by an additional excitation supply, where the current is introduced through a slip ring, which causes complicated structure, high manufacturing cost and high maintenance cost.

The alternating current induction servo motor is also called as an alternating current asynchronous servo motor. It is simple in structure, easy for manufacture and with high reliability, but the motor has serious defects of complicated controller, poor low-speed torque characteristic and low control precision.

The present invention discloses a novel induction servo motor with a constant-output-force or a constant-output-torque by using uniform magnetic fields, which is based on a new design principle and can be classified into two types: a rotary-type induction servo motor with a constant-output-torque by using uniform magnetic fields and a linear-type induction servo motor with a constant-output-force by using uniform magnetic fields. Wherein, the linear-type induction servo motor with a constant-output-force by using uniform magnetic fields is a variation form of the rotary-type induction servo motor with a constant-output-torque by using uniform magnetic fields. And the most important difference between the novel motor and an existing alternating current servo motor is that the novel motor employs uniform magnetic fields rather than rotating magnetic fields or travelling wave magnetic fields. And the main advantages of the novel motor are as follows: firstly, it has no wearing parts like slip rings, so the maintenance cost is low; secondly, the stator (primary part) has simple winding forms and structures, and the rotor (secondary part) does not adopt permanent magnetic materials, therefore, the manufacturing cost is low; thirdly, the novel motor can be powered by a fixed frequency alternating current, and the output torque or output force required can be accurately controlled by simply adjusting the voltage magnitude of the power supply; finally, its control system does not adopt a vector control principle of the existing alternating current induction servo motor, because the power supply at a fixed frequency is adopted to power the novel induction servo motor, its control system is similar to a control system of the direct current servo motor and is simple in design.

So far, No any relevant report, literature or patent is published in China and abroad with respect to the present invention: a novel induction servo motor with a constant-output-force or a constant-output-torque by using uniform magnetic fields.

SUMMARY

To solve some problems of existing servo motors, such as complicated structure, high maintenance cost, poor reliability, need of rare earth resources, high manufacturing cost, poor speed adjustment performance, complicated control system and the like, the present invention discloses a novel induction servo motor with a constant-output-force or a constant-output-torque by using uniform magnetic fields.

To solve the technical problems, the present invention adopts the following technical solutions:

The present invention discloses a novel induction servo motor with a constant-output-force or a constant-output-torque by using uniform magnetic fields, which is based on a new design principle and can be classified into two types: a rotary-type induction servo motor with a constant-output-torque by using uniform magnetic fields and a linear-type induction servo motor with a constant-output-force by using uniform magnetic fields. The two types of novel induction servo motors are based on the same principle, and the linear-type induction servo motor with a constant-output-force by using uniform magnetic fields is an evolved form of the rotary-type induction servo motor with a constant-output-torque by using uniform magnetic fields. A technical solution of the rotary-type induction servo motor with a constant-output-torque by using uniform magnetic fields is elaborated below at first.

The rotary-type induction servo motor with a constant-output-torque by using uniform magnetic fields, belongs to a rotary motor, wherein the motor is composed of N independent motor units, a rotating shaft, bearings, end covers and a cooling system. Each independent motor unit is powered by a single-phase alternating current. The N independent motor units have an equal voltage magnitude of power supply, but voltage phases are different and form an arithmetic progression with a common difference of 360°/N or 180°/N. Theoretically, to realize a constant torque output, N is required to be greater than or equal to 3. For example, the common difference is set to 360°/N. Then, when N=3, voltage phases of three independent motor units are respectively 0°, 120° and 240°, which are consistent with the voltage phases of the existing three-phase alternating current power supply. However, When N=4, voltage phases of four independent motor units are respectively 0°, 90°, 180° and 270°, but two independent motor units with the voltage phases of 0° and 180° have the same output characteristic and two independent motor units with the voltage phases of 90° and 270° have the same output characteristic. Therefore, power supplies of two independent motor units having the same output characteristic can substitute for each other by simply exchanging connecting wires. In this way, when N=4, the motor can also be degraded into a structural form adopting two independent motor units. Therefore, in the structural form, the rotary-type induction servo motor disclosed by the present invention, comprises two or more than two independent motor units.

Each independent motor unit has the same structure, and mainly comprises two parts: a stator and a rotor.

Each stator is composed of a stator shell, stator magnetic conductive silicon steels and stator excitation winding coils. The stator magnetic conductive silicon steel is formed by superimposing silicon steel sheets, and has a shape of an annular column with an annular groove. The stator excitation winding coil is similar to a multilayer solenoid type, and is installed in the annular groove of the stator magnetic conductive silicon steel. The stator shell and the stator magnetic conductive silicon steels are fixedly connected, and are kept fixed when the motor is operated.

When the stator excitation winding coil passes through the single-phase alternating current, a single-phase alternate magnetic flux is generated around the stator excitation winding coil in the stator magnetic conductive silicon steel, and is closed through the air gap between the stator magnetic conductive silicon steel and the rotor magnetic conductive silicon steel. In accordance with a mutual position relationship of the air gap and the rotating shaft of the motor, the structural forms of the independent motor units can be divided into two categories: axial arrangement and radial arrangement. Further, the independent motor units in the axial arrangement and in the radial arrangement can also be respectively subdivided into two structural forms: one-side arrangement and symmetrical arrangement.

The stator in the axial one-side arrangement form: along the direction of a motor rotating shaft, relative to the rotor magnetic conductive silicon steel, the stator magnetic conductive silicon steel is arranged on a left side or a right side. When the stator magnetic conductive silicon steel is on the left side, the annular groove on the stator magnetic conductive silicon steel is on the right side. When the stator magnetic conductive silicon steel is on the right side, the annular groove on the stator magnetic conductive silicon steel is on the left side. The stator excitation winding coil is installed in the annular groove on the stator magnetic conductive silicon steel.

The stator in the axial symmetrical arrangement form: two stator magnetic conductive silicon steels are respectively arranged on both sides of the rotor, and are respectively called as a stator left magnetic conductive silicon steel and a stator right magnetic conductive silicon steel. The annular groove on the stator left magnetic conductive silicon steel is on the right side, and the annular groove on the stator right magnetic conductive silicon steel is on the left side. The stator in the axial symmetrical arrangement form can be regarded as a combination of two stators in the axial one-side arrangement form. At this moment, two groups of stator excitation winding coils are installed in the annular grooves on the stator left magnetic conductive silicon steel and the stator right magnetic conductive silicon steel, respectively.

The stator in the radial one-side arrangement form: relative to the rotor axis, the stator magnetic conductive silicon steel is arranged on an inner side or an outer side of the rotor. When the stator magnetic conductive silicon steel is arranged on the outer side, the annular groove on the stator magnetic conductive silicon steel is on the inner side. When the stator magnetic conductive silicon steel is on the inner side, the annular groove on the stator magnetic conductive silicon steel is on the outer side. This arrangement is structurally similar to a form of an ordinary alternating current motor with an inner rotor or an outer rotor. However, a big difference from the ordinary alternating current motor is that the stator excitation winding coil installed on the stator magnetic conductive silicon steel, passes through the single-phase alternating current, and meanwhile, the winding form of the stator excitation winding coil is simple, similar to a solenoid type.

The stator in the radial symmetrical arrangement form: relative to the rotor axis, two stator magnetic conductive silicon steels are arranged on the inner side and the outer side of the rotor, and are respectively called as a stator inner magnetic conductive silicon steel and a stator outer magnetic conductive silicon steel. The annular groove on the stator inner magnetic conductive silicon steel is on the outer side, and the annular groove on the stator outer magnetic conductive silicon steel is on the inner side. The stator in the radial symmetrical arrangement form can be regarded as a combination of two stators in the radial one-side arrangement form. At this moment, two groups of stator excitation winding coils are installed in the annular grooves on the stator inner magnetic conductive silicon steel and the stator outer magnetic conductive silicon steel, respectively. In this case, the structure of the rotor shall be designed into a cup type in order to facilitate the output of movements.

Each rotor is composed of a rotor wheel hub, rotor magnetic conductive silicon steels, rotor induction excitation winding coils and rotor torque winding coils. The rotor magnetic conductive silicon steel is formed by uniformly arranging M silicon steel pieces along a circumference. Each silicon steel piece has the same shape. An air gap is reserved between adjacent silicon steel pieces. The overall shape of the rotor magnetic conductive silicon steel is similar to the annular column with multiple gaps. Each silicon steel piece has a groove in a circumferential direction so that an annular groove is formed on the whole on the rotor magnetic conductive silicon steel. The position of annular groove corresponds to the annular groove on the stator magnetic conductive silicon steel. According to the different structure forms of the independent motor units, each silicon steel piece is different in positions of the groove in the circumferential direction, wherein the groove is formed on the inner or outer cylindrical surface or formed on the end surfaces. Meanwhile, each silicon steel piece has a through groove in the middle. The direction of the through groove is vertical with the direction of the annular groove; and according to the different structure forms of the independent motor units, the through groove is designed in a radial direction or an axial direction and is used for installing the rotor torque winding coil. The rotor induction excitation winding coil is installed in the annular groove on the rotor magnetic conductive silicon steel. The rotor torque winding coil is wound on the rotor magnetic conductive silicon steel through the through grooves on the M silicon steel pieces. The rotor magnetic conductive silicon steel is fixedly connected to the rotor wheel hub, and the rotor magnetic conductive silicon steel, the rotor wheel hub and the rotating shaft rotate together when the motor is operated.

The rotor in the axial one-side arrangement form: each silicon steel piece forming a rotor magnetic conductive silicon steel can be geometrically described as: the silicon steel piece is formed by connecting a plurality of annular sector columns along the radial direction, and each annular sector column has the rectangular section and the equal angle of sector; there are one or more connecting bodies with small sizes between two adjacent annular sector columns. Relative to the rotor axis, annular sector columns are arranged on an inner side and an outer side of each silicon steel piece; and in the middle of each silicon steel piece, the connecting bodies and the annular sector column are alternately arranged. Because each connecting body has small sizes including a small axial thickness and a small angle of sector, a plurality of through grooves along the rotor axial direction and long grooves along a circumferential direction are formed on each silicon steel piece. M silicon steel pieces are uniformly arranged along the circumference. A plurality of annular sector columns form a plurality of annular columns having M gaps along the circumference. A plurality of through grooves along the rotor axial direction are formed by the connecting bodies between two adjacent annular columns, and the annular grooves along the circumferential direction are also formed. The rotor induction excitation winding coils are installed in the annular grooves. The rotor torque winding coils are wound on the annular columns of the rotor magnetic conductive silicon steel through the through grooves, and a plurality of groups of rotor inner and outer torque winding coils are formed.

The rotor in the axial symmetrical arrangement form: the rotor in the axial symmetrical arrangement form is equivalent to a combination of two rotors in the axial one-side arrangement form; two rotor magnetic conductive silicon steels are jointly installed on one rotor wheel hub and form a mirror image relationship relative to the rotor wheel hub's symmetric plane perpendicular to the rotor axis. The two rotor magnetic conductive silicon steels are called as a rotor left magnetic conductive silicon steel and a rotor right magnetic conductive silicon steel, respectively. On the rotor left magnetic conductive silicon steel, the annular groove for installing the rotor left induction excitation winding coil is on the left side, and corresponds to the annular groove on the stator left magnetic conductive silicon steel for installing the stator left excitation winding coil. On the rotor right magnetic conductive silicon steel, the annular groove for installing the rotor right induction excitation winding coil is on the right side, and corresponds to the annular groove on the stator right magnetic conductive silicon steel for installing the stator right excitation winding coil. Two groups of rotor induction excitation winding coils are installed in the annular grooves on the rotor left magnetic conductive silicon steel and the rotor right magnetic conductive silicon steel, respectively. The rotor torque winding coils are respectively wound on the plurality of annular columns of the rotor left magnetic conductive silicon steel and the rotor right magnetic conductive silicon steel through the through grooves among the plurality of annular columns, to form a plurality of groups of rotor inner and outer torque winding coils. In this case, the plurality of groups of rotor inner and outer torque winding coils are equivalent to a result of respectively combining a plurality of groups of inner and outer torque winding coils of two rotors in the axial one-side arrangement form.

The rotor in the radial one-side arrangement form: each silicon steel piece forming a rotor magnetic conductive silicon steel can be geometrically described as: the silicon steel piece is formed by connecting a plurality of annular sector columns along the axial direction, and each annular sector column has the rectangular section and the equal angle of sector; there are one or more connecting bodies with small sizes between two adjacent annular sector columns. Along the rotor axis, annular sector columns are arranged on the left side and the right side of each silicon steel piece; and in the middle of the silicon steel piece, the connecting bodies and the annular sector column are alternately arranged. Because each connecting body has small sizes including a small radial thickness and a small angle of sector, a plurality of through grooves along the radial direction and long grooves along the circumferential direction are formed on each silicon steel piece. After M silicon steel pieces are uniformly arranged on the wheel hub along the circumference, a plurality of annular sector columns form a plurality of annular columns having M gaps along the circumference; meanwhile, a plurality of through grooves along the radial direction are formed by the connecting bodies between two adjacent annular columns, and the annular grooves along the circumferential direction are formed at the outer side or the inner side. The rotor induction excitation winding coils are installed in the annular grooves. The rotor torque winding coils are respectively wound on the rotor magnetic conductive silicon steel through the through grooves among the plurality of annular columns, and rotor left torque winding coils, rotor middle torque winding coils and rotor right torque winding coils are formed.

The rotor in the radial symmetrical arrangement form: a motor with a rotor in the radial symmetrical arrangement form belongs to a double-stator motor having outer and inner stators, and the structure of the rotor in an independent motor unit needs to be designed into a cup type. The rotor in the radial symmetrical arrangement form is equivalent to a combination of two rotors in the radial one-side arrangement form. Two rotor magnetic conductive silicon steels are installed on an inner side and an outer side of a rotor cup and are called as a rotor inner magnetic conductive silicon steel and a rotor outer magnetic conductive silicon steel, respectively. The silicon steel pieces of the rotor inner magnetic conductive silicon steel and the rotor outer magnetic conductive silicon steel have the same number and the same radial symmetric plane. On the rotor outer magnetic conductive silicon steel, the annular groove for installing the rotor outer induction excitation winding coil is on the outer side; and on the rotor inner magnetic conductive silicon steel, the annular groove for installing the rotor inner induction excitation winding coil is on the inner side. The annular grooves on the rotor inner magnetic conductive silicon steel and the rotor outer magnetic conductive silicon steel respectively correspond to the annular grooves on the stator inner magnetic conductive silicon steel and the stator outer magnetic conductive silicon steel. Two groups of rotor induction excitation winding coils are respectively installed in the annular grooves on the rotor inner magnetic conductive silicon steel and the rotor outer magnetic conductive silicon steel. The rotor torque winding coils are respectively wound on the rotor inner magnetic conductive silicon steel and the rotor outer magnetic conductive silicon steel through the through grooves among the plurality of annular columns, to form rotor left torque winding coils, rotor middle torque winding coils and rotor right torque winding coils. In this case, the rotor left torque winding coils, the rotor middle torque winding coils and the rotor right torque winding coils are equivalent to a result of respectively combining the left torque winding coils, the middle torque winding coils and the right torque winding coils of two rotors in the radial one-side arrangement form.

At this point, the basic structural forms and compositions of an independent motor unit of the rotary-type induction servo motor with a constant-output-torque by using uniform magnetic fields are illustrated. The basic structure forms include axial one-side arrangement, axial symmetrical arrangement, radial one-side arrangement and radial symmetrical arrangement. The four basic structural forms can be combined, including a combination of axial arrangements, a combination of radial arrangements, a combination of axial arrangement and radial arrangement and the like. For example, with respect to the combination of axial arrangements, to increase the torque, for the independent motor units in the axial one-side arrangement or axial symmetrical arrangement, the diameters of the rotor and the stator are increased and a plurality of groups of stator and rotor magnetic conductive silicon steels and corresponding winding coils are arranged along the radial direction of the rotor and the stator. For example, with respect to the combination of axial arrangement and radial arrangement, the rotor magnetic conductive silicon steel and corresponding winding coils of a rotor in the radial one-side arrangement form can be installed in the radial direction of the rotor of the independent motor units in the axial one-side arrangement or axial symmetrical arrangement, and the stator magnetic conductive silicon steel and winding coils of the stator in the radial one-side arrangement form are also installed in corresponding positions. In addition, to reduce the axial size, a plurality of independent motor units can also be arranged in the same plane, similar to a disk type motor. In this case, the radial size of each independent motor unit is different. To obtain a constant-torque output, the structural size shall be correspondingly adjusted.

In the basic structure forms of the independent motor units, the stator excitation winding coil or the rotor induction excitation winding coil adopts a long annular coil with multilayer solenoid type, and the axis of the long annular coil is the motor axis. Alternatively, the long annular coil can also be replaced by a combination of a plurality of groups of short coils with multilayer solenoid type. The short coils are uniformly distributed and installed along the circumference of the stator magnetic conductive silicon steel or the rotor magnetic conductive silicon steel.

The rotary-type induction servo motor with a constant-output-torque by using uniform magnetic fields has some features: each independent motor unit is powered by a single-phase alternating current; the excitation magnetic field is produced by excitation winding coils with multilayer solenoid type; the stator magnetic conductive silicon steel and the rotor magnetic conductive silicon steel are installed around the windings of the excitation winding coils; in the stator magnetic conductive silicon steel and the air gap between the stator and the rotor, the alternating magnetic field is produced, where the direction of a magnetic field line is unchanged, the magnetic field of each point becomes strong and weak simultaneously, and no rotating magnetic field or travelling wave magnetic field is produced. Two kinds of coils are wound on the rotor magnetic conductive silicon steel. The first kind of coil is the rotor induction excitation winding coil, and the second kind is the rotor torque winding coil. The rotor induction excitation winding coil produces current in the rotor torque winding coil through mutual inductance with the stator excitation winding coil. In space, the winding direction of the rotor torque winding coil is perpendicular to the winding direction of the rotor induction excitation winding coil.

The direction of the output torque generated by the independent motor unit is relevant to connecting wires of the rotor induction excitation winding coil and the rotor torque winding coil. The torque direction can be changed by exchanging the connecting wires. Therefore, to realize forward and reverse driving of the motor, the following three methods can be adopted: (1) two groups of independent motor units are adopted in a motor; one group realizes forward driving, and the other group realizes reverse driving; this is equivalent to series connection of two motors; (2) in an independent motor unit, an electromagnetic switch is added to exchange connecting wires of the winding coils of the rotor; in this case, an induction control apparatus should be added to realize control over the electromagnetic switch; (3) for the independent motor unit in the symmetrical arrangement form, in order to change the current phases of the rotor torque winding coils and realize forward and reverse driving of the motor, two groups of rotor induction excitation winding coils are reversely connected in series to supply power for the rotor torque winding coils, and meanwhile, relative magnitudes of the applied voltage on the stator excitation winding coils are adjusted.

Based on the rotary-type induction servo motor with a constant-output-torque by using uniform magnetic fields described above, the technical solution of a linear-type induction servo motor with a constant-output-force by using uniform magnetic fields is illustrated below.

The linear-type induction servo motor with a constant-output-force by using uniform magnetic fields is an evolved form of the above rotary-type induction servo motor with a constant-output-torque by using uniform magnetic fields. An independent motor unit of the rotary-type induction servo motor with a constant-output-torque by using uniform magnetic fields is unrolled along the circumference, and the stator and the rotor are respectively evolved into a primary part and a secondary part of an independent motor unit of the linear-type induction servo motor with a constant-output-force by using uniform magnetic fields. According to a relative position relationship between the primary part and the secondary part, the structure form of the independent motor units comprises one-side arrangement, symmetrical arrangement and multi-side arrangement.

Each independent motor unit of the linear-type induction servo motor with a constant-output-force by using uniform magnetic fields mainly comprises two parts: a primary part and a secondary part.

The primary part of each independent motor unit is composed of a base, primary magnetic conductive silicon steels and primary excitation winding coils. The primary magnetic conductive silicon steel is a linear-type structure with an annular groove. The primary excitation winding coil is powered by a single-phase alternating current, adopts a simple winding manner similar to a solenoid type and is installed in the annular groove on the primary magnetic conductive silicon steel. The primary magnetic conductive silicon steel is fixedly connected to the base, and the primary magnetic conductive silicon steel and the base are kept fixed when the motor is operated. According to the different structure forms of one-side arrangement, symmetrical arrangement or multi-side arrangement, each independent motor unit comprises one or more primary magnetic conductive silicon steels. The annular groove on each primary magnetic conductive silicon steel is formed at one side near the secondary part. Correspondingly, primary excitation winding coils also comprise one or more groups, and are installed in the annular grooves on the primary magnetic conductive silicon steels, respectively.

The secondary part of each independent motor unit is composed of a mobile piece, secondary magnetic conductive silicon steels, secondary induction excitation winding coils, secondary output force winding coils and secondary end magnet yokes. The secondary magnetic conductive silicon steel is formed by arranging M silicon steel pieces along a linear line. Each silicon steel piece has the same shape, and an air gap is reserved between adjacent silicon steel pieces.

The overall shape of the secondary magnetic conductive silicon steel is a linear-type structure having a plurality of gaps. In a side surface of the linear-type structure, each silicon steel piece is designed with an groove, so that an annular groove is formed in the side surface of the secondary magnetic conductive silicon steel. After the motor is assembled, the position of the annular groove corresponds to the annular groove on the primary magnetic conductive silicon steel so that the primary excitation winding coil and the secondary induction excitation winding coil are coupled. Meanwhile, a through groove used for installing the secondary output force winding coil is also designed on each silicon steel piece. Directions of the through groove and the annular groove are mutually vertical. The direction of the through groove is horizontal or vertical, depending on the arrangement form of the primary magnetic conductive silicon steel and the secondary magnetic conductive silicon steel. The secondary induction excitation winding coil is installed in the annular groove on the side surface of the secondary magnetic conductive silicon steel and adopts a simple winding manner similar to a solenoid type. The secondary output force winding coil is wound on each silicon steel piece of the secondary magnetic conductive silicon steel through the through grooves on the secondary magnetic conductive silicon steel. The winding direction of the secondary output force winding coil and the winding direction of the secondary induction excitation winding coil are perpendicular in space. The secondary magnetic conductive silicon steel is fixedly connected to the mobile piece. The secondary end magnetic yokes are installed on both ends of the secondary magnetic conductive silicon steel and also fixedly connected to the mobile piece. According to the different structure forms of one-side arrangement, symmetrical arrangement or multi-side arrangement, each independent motor unit comprises one or more secondary magnetic conductive silicon steels. The annular groove on each secondary magnetic conductive silicon steel is formed at one side near the primary part. Correspondingly, the secondary induction excitation winding coils also comprise one or more groups, and are respectively installed in the annular grooves on the secondary magnetic conductive silicon steels. Of course, the secondary output force winding coils also comprise one or more groups, and are wound on M silicon steel pieces through the through grooves on the secondary magnetic conductive silicon steel.

In each independent motor unit of the linear-type induction servo motor with a constant-output-force by using uniform magnetic fields, an air gap is reserved between the primary part and the secondary part. The primary magnetic conductive silicon steel, the secondary magnetic conductive silicon steel and the secondary end magnetic yokes are formed by superimposing silicon steel sheets. The secondary induction excitation winding coil and the secondary output force winding coil are connected. Because of the convenient power supply mode of the linear-type induction servo motor with a constant-output-force by using uniform magnetic fields, the primary part structure and the secondary part structure of the independent motor unit can be exchanged, and the independent motor unit can be designed as a structure form with a long primary part and a short secondary part or with a short primary part and a long secondary part.

At this point, the technical solutions of a novel induction servo motor with a constant-output-force or a constant-output-torque by using uniform magnetic fields, including the rotary-type induction servo motor with a constant-output-torque by using uniform magnetic fields and the linear-type induction servo motor with a constant-output-force by using uniform magnetic fields, are completely illustrated.

In summary, the rotary-type induction servo motor with a constant-output-torque by using uniform magnetic fields has simple structure, for example, the stator magnetic conductive silicon steel is simple in structure and the winding manner of stator winding coils is simple; permanent magnetic materials are not used, so manufacturing cost is low; a slip ring and related wearing parts are not used, so maintenance cost is low; although rotor windings are powered through induction, the motor has constant-torque characteristics and is similar to a direct current motor; the control over the output torque of the motor is realized by adjusting voltage magnitude or voltage frequency of the power supply, but in design, the voltage frequency can be fixed so as to select an appropriate or optimal motor operating frequency for reducing energy loss; under the conditions that the magnetic induction intensity of the stator magnetic conductive silicon steel and the rotor magnetic conductive silicon steel is unsaturated and the resistance of winding coils is neglected, the output torque of the motor is in direct proportion to the stator excitation voltages and is irrelevant to the rotating speed of the rotor, thereby simplifying the design of a servo controller and realizing high control precision and reliable operation. And the axial symmetrical arrangement form of the motor is easy to realize low speed and high torque design. Meanwhile, the rotary-type induction servo motor with a constant-output-torque by using uniform magnetic fields can also be evolved into the linear-type induction servo motor with a constant-output-force by using uniform magnetic fields.

In the figures: 1 rotor outer torque winding coil; 2 rotor inner torque winding coil; 3 rotor wheel hub; 4 rotating shaft; 5 bearing; 6 end cover; 7 stator shell; 8 stator left magnetic conductive silicon steel; 9 stator left excitation winding coil; 10 rotor left induction excitation winding coil; 11 rotor left magnetic conductive silicon steel; 12 rotor right magnetic conductive silicon steel; 13 rotor right induction excitation winding coil; 14 stator right excitation winding coil; 15 stator right magnetic conductive silicon steel; 16 stator magnetic conductive silicon steel; 17 stator excitation winding coil; 18 rotor left torque winding coil; 19 rotor induction excitation winding coil; 20 rotor magnetic conductive silicon steel; 21 rotor right torque winding coil; 22 mobile piece; 23 primary left magnetic conductive silicon steel; 24 secondary left magnetic conductive silicon steel; 25 secondary right magnetic conductive silicon steel; 26 primary right magnetic conductive silicon steel; 27 primary left excitation winding coil; 28 secondary left induction excitation winding coil; 29 secondary right induction excitation winding coil; 30 primary right excitation winding coil; 31 secondary lower output force winding coil; 32 secondary middle output force winding coil; 33 secondary upper output force winding coil; 34 base; 35 guide rail; 36 secondary end magnet yoke.

DETAILED DESCRIPTION

Because application occasions and requirements are different, specific forms and structures of the novel induction servo motor with a constant-output-force or a constant-output-torque by using uniform magnetic fields will vary. The present invention is described below in detail in combination with technical solutions and drawings.

Embodiment 1: A Rotary-type Induction Servo Motor with a Constant-Output-Torque by Using Uniform Magnetic Fields (Three Independent Motor Units in the Axial Symmetrical Arrangement Form)

Figure 1:
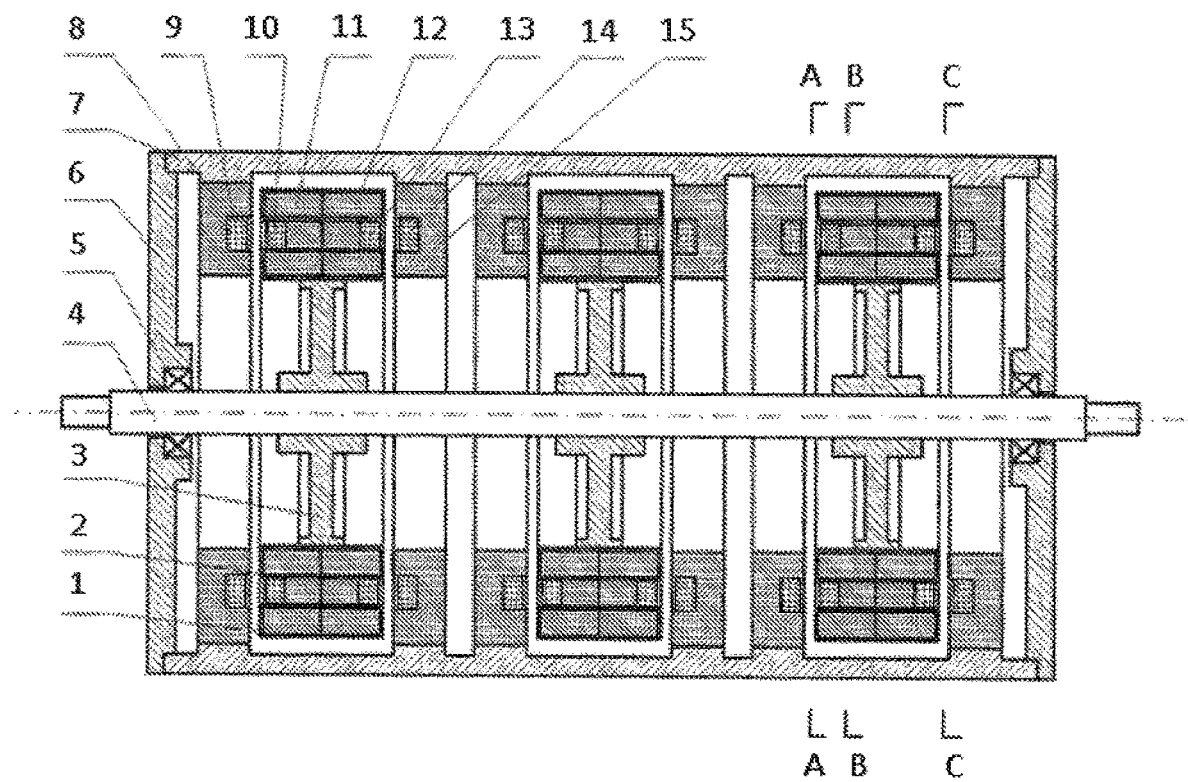
FIG. 1 shows a rotary-type induction servo motor with a constant-output-torque by using uniform magnetic fields (three independent motor units in the axial symmetrical arrangement form).

The rotary-type induction servo motor with a constant-output-torque by using uniform magnetic fields, as shown in FIG. 1, is composed of a rotating shaft 4, bearings 5, end covers 6 and three independent motor units. The motor is powered by fixed-frequency three-phase alternating current. Each phase of three-phase alternating current powers one independent motor unit. The voltage phases are 0°, 120° and 240°, respectively. During operation, the voltage frequency of power supply is constant. The output torque of the motor is controlled by adjusting the voltage magnitude of the power supply.

Three independent motor units have the same structure, as shown in FIG. 1. Each independent motor unit adopts an axial symmetrical arrangement form. See the partial enlarged drawing FIG. 2 for the structures of the stator and the rotor.

Figure 6:
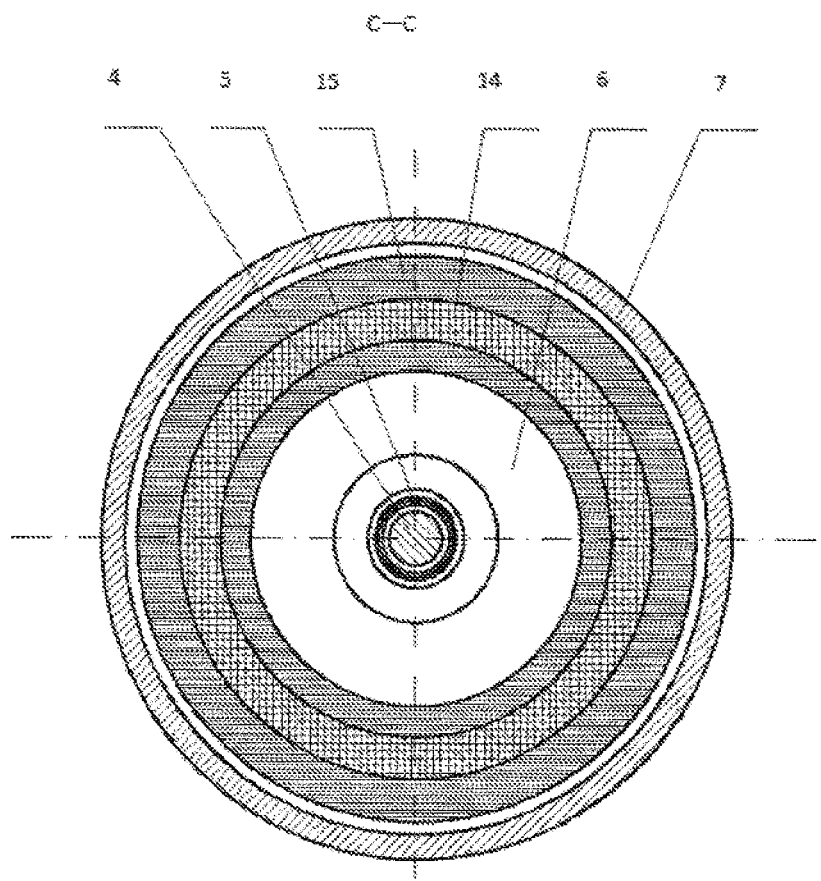
FIG. 6 is a C-C sectional view of a rotary-type induction servo motor with a constant-output-torque by using uniform magnetic fields.
Figures 9, 10:
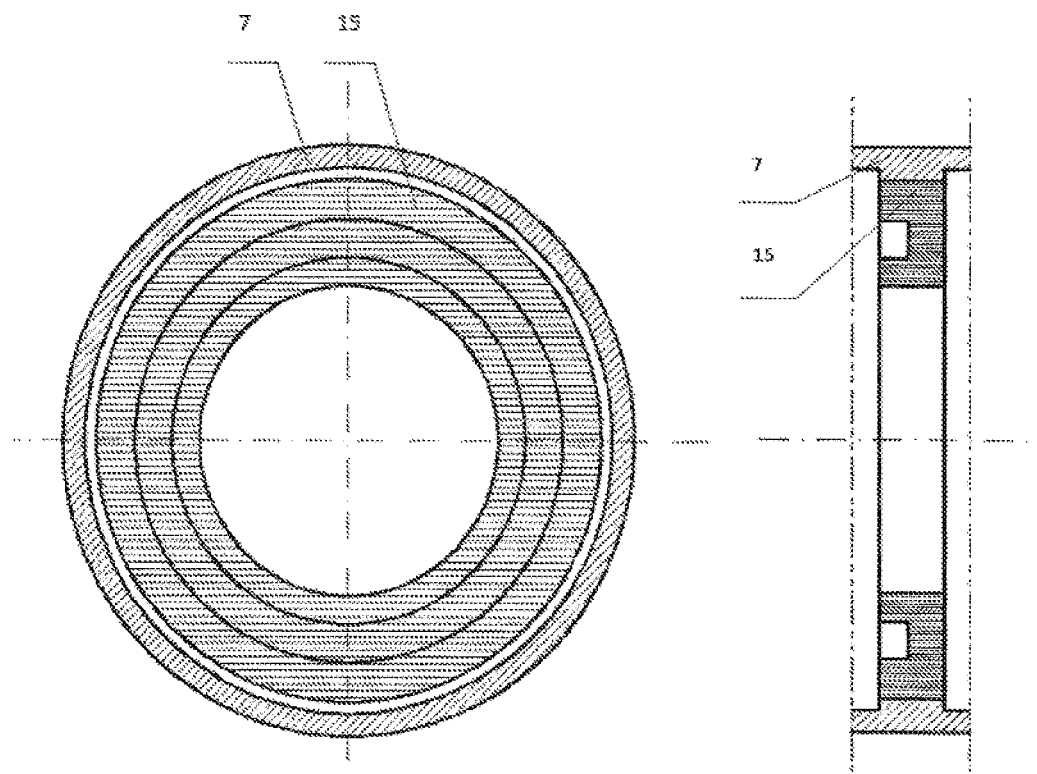
FIG. 9 shows a stator shell and a stator right magnetic conductive silicon steel of a rotary-type induction servo motor with a constant-output-torque by using uniform magnetic fields.
FIG. 10 is a sectional view of a stator shell and a stator right magnetic conductive silicon steel of a rotary-type induction servo motor with a constant-output-torque by using uniform magnetic fields.

The stator of each independent motor unit is composed of a stator shell 7, a stator left magnetic conductive silicon steel 8, a stator left excitation winding coil 9, a stator right excitation winding coil 14 and a stator right magnetic conductive silicon steel 15. The stator right magnetic conductive silicon steel 15 is an annular column with a rectangular section, and there is an annular groove in the middle of a left side surface of the annular column. The stator right magnetic conductive silicon steel 15 is fixedly connected to the stator shell 7, as shown in FIG. 9 and FIG. 10. The stator left magnetic conductive silicon steel 8 has the basically same structure as the stator right magnetic conductive silicon steel 15, and the difference is that the annular groove is formed on its right side surface. The stator right excitation winding coil 14 and the stator left excitation winding coil 9 are respectively installed in the annular grooves on the stator right magnetic conductive silicon steel 15 and the stator left magnetic conductive silicon steel 8, as shown in FIG. 6, and are respectively coupled with the rotor right induction excitation winding coil 13 and the rotor left induction excitation winding coil 10, as shown in FIG. 2.

Figure 2:
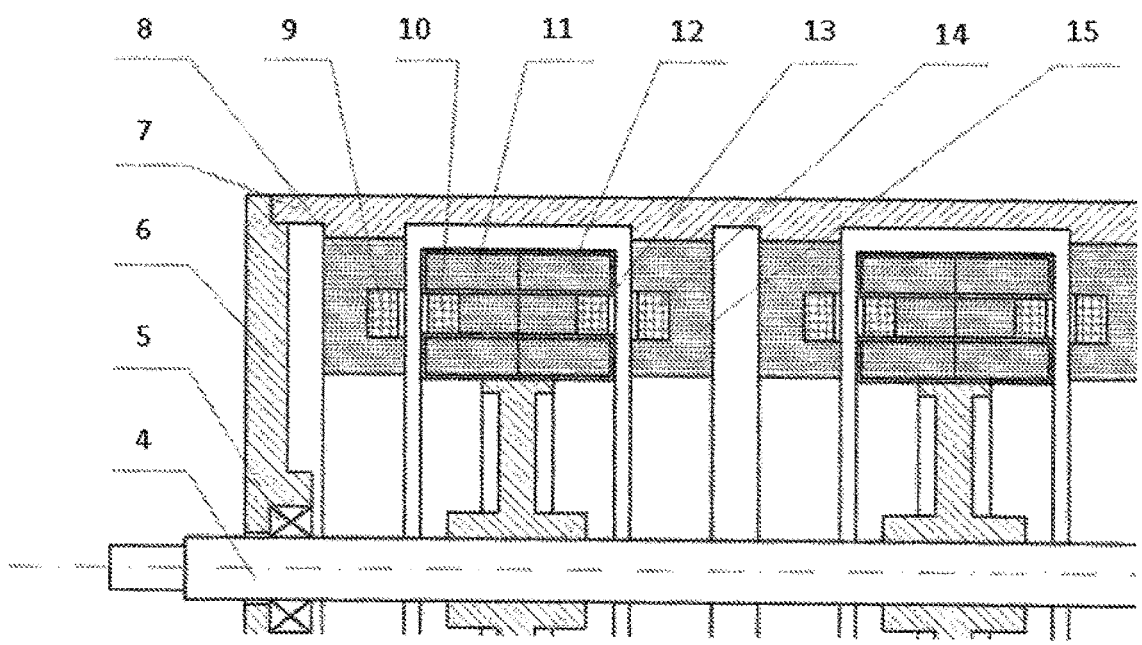
FIG. 2 is a partial enlarged drawing of a rotary-type induction servo motor with a constant-output-torque by using uniform magnetic fields (three independent motor units in the axial symmetrical arrangement form).

The rotor of each independent motor unit is composed of a rotor wheel hub 3, a rotor left magnetic conductive silicon steel 11, a rotor right magnetic conductive silicon steel 12, a rotor left induction excitation winding coil 10, a rotor right induction excitation winding coil 13, a rotor outer torque winding coil 1 and a rotor inner torque winding coil 2, as shown in FIG. 1 and FIG. 2. The rotor is installed on the rotating shaft 4 through the rotor wheel hub 3.

Figures 7, 8:
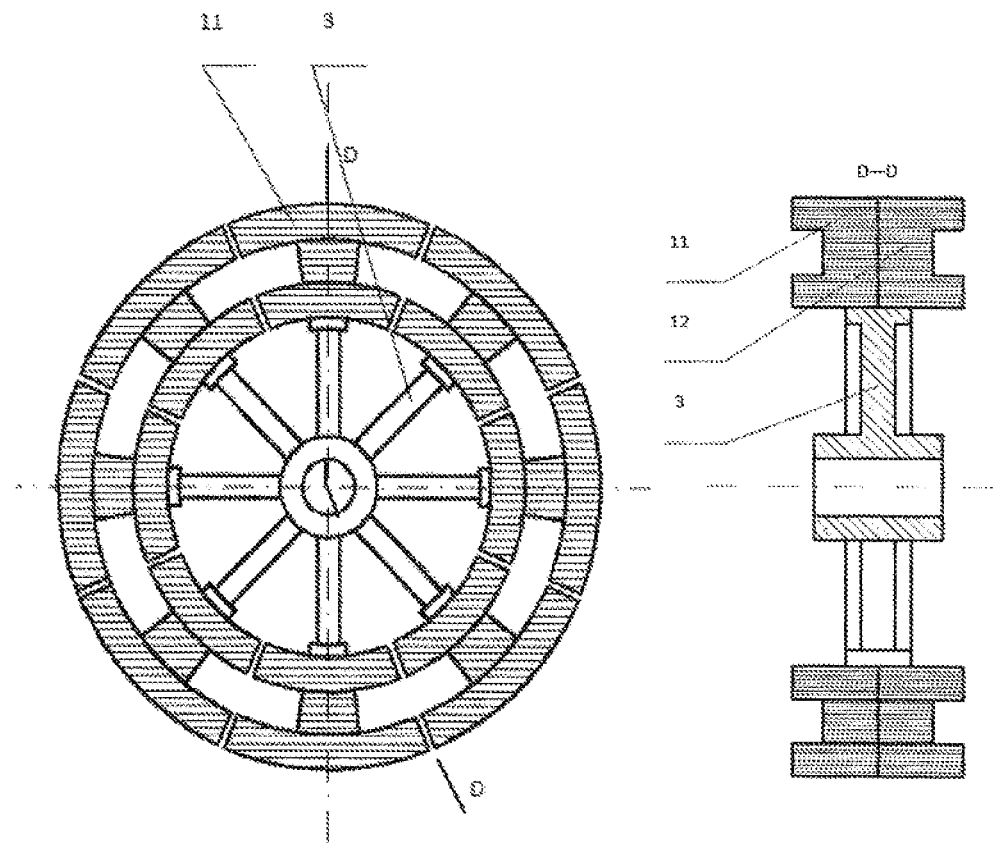
FIG. 7 shows a rotor wheel hub and a rotor magnetic conductive silicon steel of a rotary-type induction servo motor with a constant-output-torque by using uniform magnetic fields.
FIG. 8 is a D-D sectional view of a rotor wheel hub and a rotor magnetic conductive silicon steel of a rotary-type induction servo motor with a constant-output-torque by using uniform magnetic fields.

The rotor left magnetic conductive silicon steel 11 and the rotor right magnetic conductive silicon steel 12 are respectively composed of eight silicon steel pieces. The eight silicon steel pieces are uniformly distributed along the circumference of the rotor wheel hub 3 and fixedly connected to the rotor wheel hub 3. An air gap is reserved between adjacent silicon steel pieces, as shown in FIG. 7 and FIG. 8. Each silicon steel piece can be geometrically regarded as being formed by connecting two annular sector columns along the radial direction, and each annular sector column has the rectangular section. There is a connecting body between the two annular sector columns. The connecting body is also an annular sector column with rectangular section and has a small angle of sector and a small axial thickness. After eight silicon steel pieces with the same shape are uniformly arranged along the circumference, the annular sector columns on the outer side and the inner side will form two annular columns having eight gaps along the circumference. And the annular columns on the inner side and the outer side are connected by the middle connecting bodies or eight annular sector columns with small sizes. Because the sector angles of the middle connecting bodys are small, eight axial through grooves are formed between the two annular columns on the inner side and the outer side. Meanwhile, because the axial thickness of the middle connecting bodies is small, an annular groove along the circumferential direction is formed at the left side of the rotor left magnetic conductive silicon steel 11, and an annular groove along the circumferential direction is formed at the right side of the rotor right magnetic conductive silicon steel 12.

Figure 3:
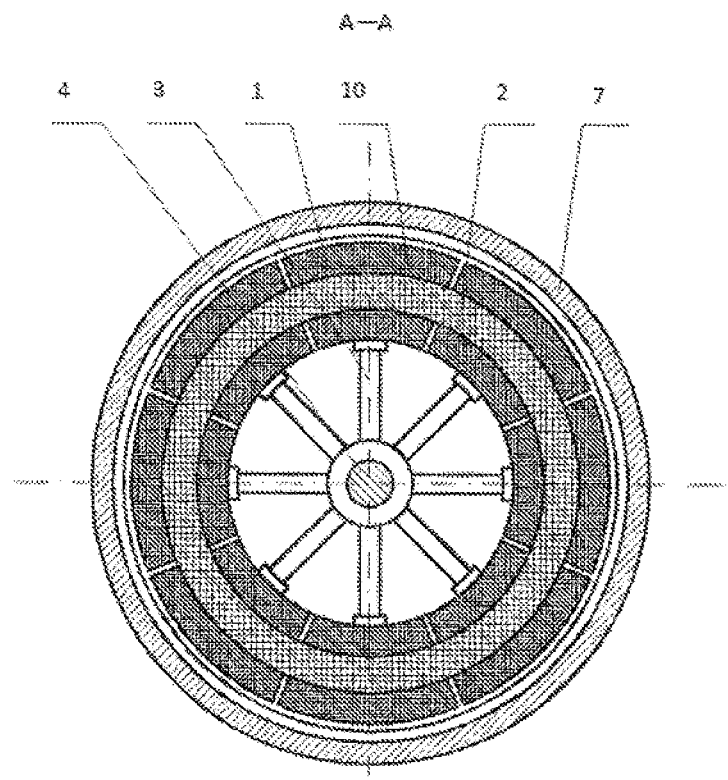
FIG. 3 is an A-A sectional view of a rotary-type induction servo motor with a constant-output-torque by using uniform magnetic fields.
Figure 4:
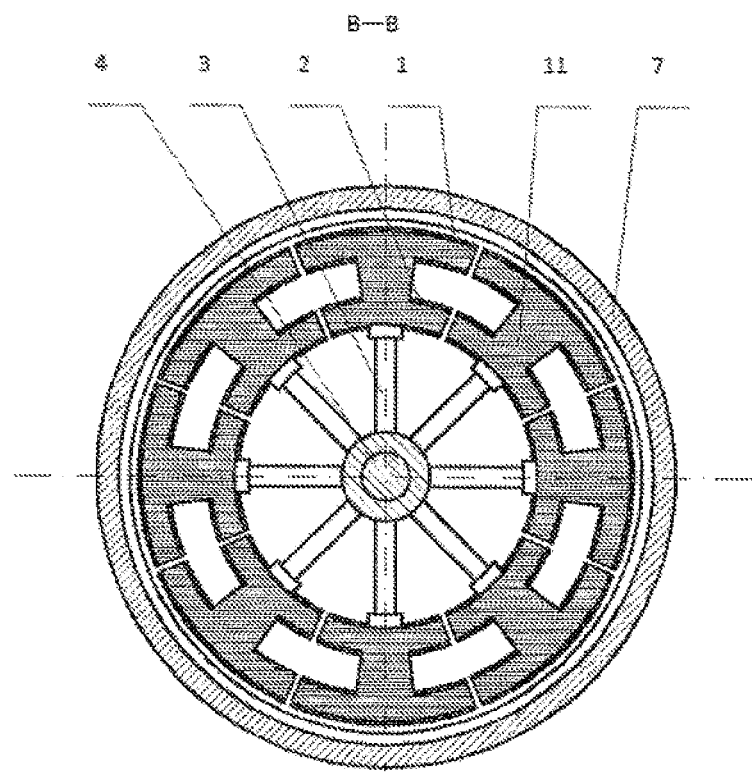
FIG. 4 is a B-B sectional view of a rotary-type induction servo motor with a constant-output-torque by using uniform magnetic fields.
Figure 5:
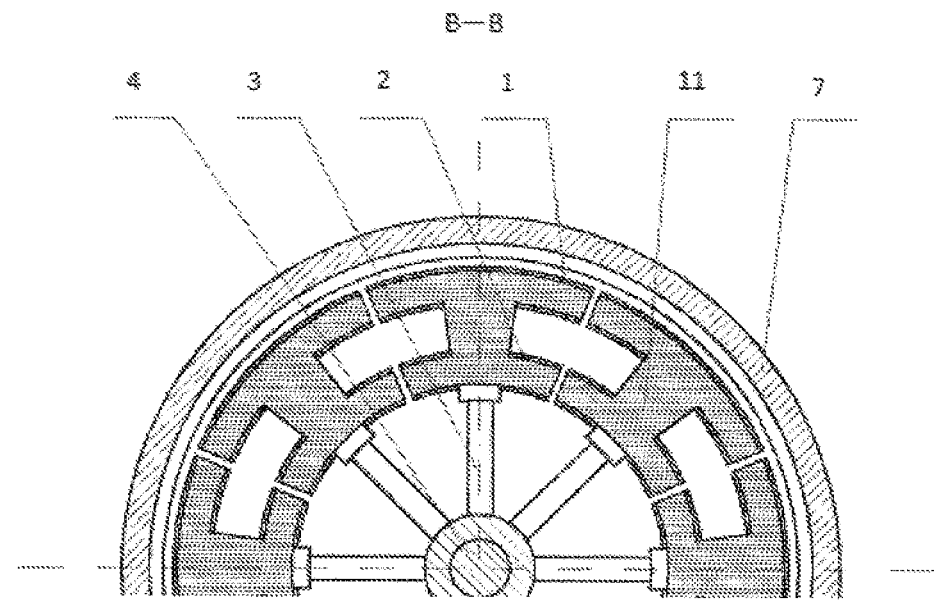
FIG. 5 is a partial enlarged drawing of a B-B section of a rotary-type induction servo motor with a constant-output-torque by using uniform magnetic fields.

The rotor left magnetic conductive silicon steel and the rotor right magnetic conductive silicon steel have structural characteristics that: the annular grooves are respectively formed at left middles and right middles of the rotor left magnetic conductive silicon steel and the rotor right magnetic conductive silicon steel; meanwhile, the rotor left magnetic conductive silicon steel and the rotor right magnetic conductive silicon steel have eight identical axial through grooves; and two groups of inner and outer annular columns are formed on the whole on the rotor left magnetic conductive silicon steel and the rotor right magnetic conductive silicon steel, as shown in FIG. 7 and FIG. 8. The rotor left induction excitation winding coil 10 and the rotor right induction excitation winding coil 13 are respectively installed in the annular grooves on the rotor left magnetic conductive silicon steel 11 and the rotor right magnetic conductive silicon steel 12, as shown in FIG. 2 and FIG. 3. The rotor outer torque winding coil 1 and the rotor inner torque winding coil 2 respectively comprise eight groups of coils, which are respectively wound on the inner and the outer annular sector columns through the eight axial through grooves on the rotor left magnetic conductive silicon steel and the rotor right magnetic conductive silicon steel, as shown in FIGS. 2, 3, 4 and 5. And FIG. 4 and FIG. 5 are sectional views of the rotor outer torque winding coil 1 and the rotor inner torque winding coil 2. In space, the winding direction of the rotor torque winding coils 1 and 2 is perpendicular to the winding direction of the rotor induction excitation winding coil 10 and 13, as shown in FIG. 2 and FIG. 3.

An air gap is reserved between the stator and the rotor of each independent motor unit. After connected in series, the rotor left induction excitation winding coil 10 and the rotor right induction excitation winding coil 13 are connected with the rotor outer torque winding coil 1 and the rotor inner torque winding coil 2.

Embodiment 2: A Rotary-type Induction Servo Motor with a Constant-Output-Torque by Using Uniform Magnetic Fields (Four Independent Motor Units in the Axial One-side Arrangement Form)

The rotary-type induction servo motor with a constant-output-torque by using uniform magnetic fields is similar to the motor in embodiment 1, and the main difference is that the structure and number of the independent motor units are different. Therefore, the structure of the independent motor units in the present embodiment are mainly introduced below.

The rotary-type induction servo motor with a constant-output-torque by using uniform magnetic fields is composed of a rotating shaft 4, bearings 5, end covers 6 and four independent motor units. The motor is powered by fixed-frequency four-phase alternating current. Each phase of the four-phase alternating current powers one independent motor unit. The voltage phases are respectively 0°, 90°, 180° and 270°. During operation, the voltage frequency of power supply is constant. The output torque of the motor is controlled by adjusting the voltage magnitude of the power supply.

Figure 11:
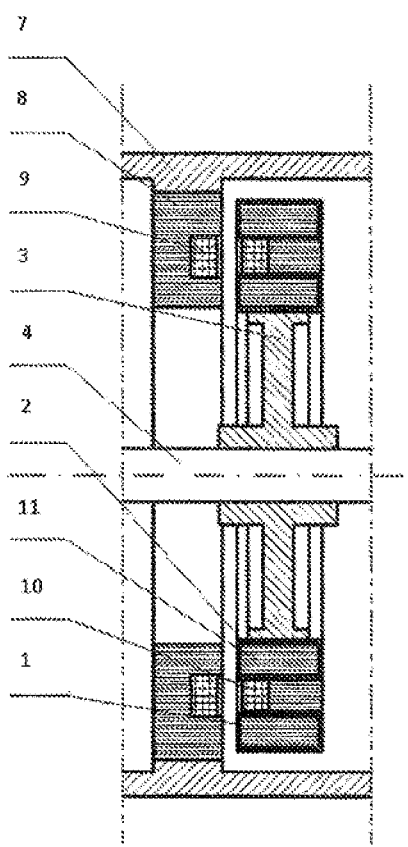
FIG. 11 shows an independent motor unit in the axial one-side arrangement form in a rotary-type induction servo motor with a constant-output-torque by using uniform magnetic fields.
Figure 12:
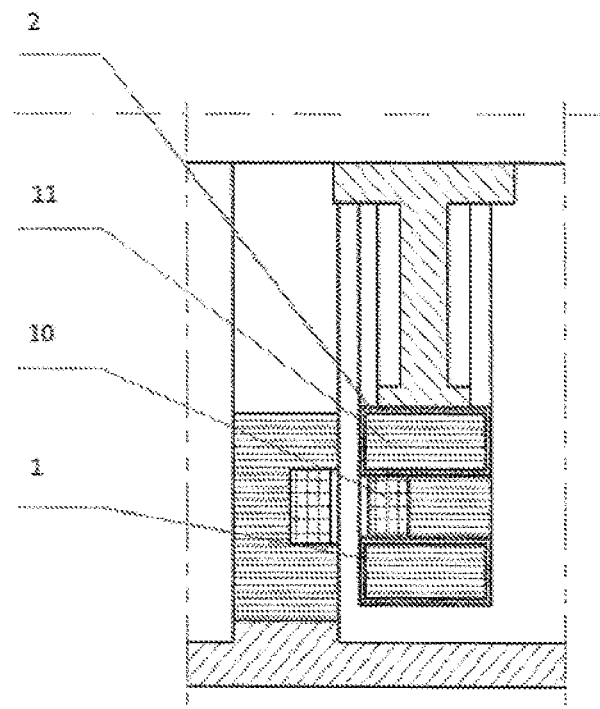
FIG. 12 is a partial enlarged drawing of an independent motor unit in the axial one-side arrangement form in a rotary-type induction servo motor with a constant-output-torque by using uniform magnetic fields.

The four independent motor units have the same structure. Each of them adopts the axial one-side arrangement form, as shown in FIG. 11. And FIG. 12 is a partial enlarged drawing of the independent motor unit.

The stator of each independent motor unit is composed of a stator shell 7, a stator left magnetic conductive silicon steel 8 and a stator left excitation winding coil 9. The stator left magnetic conductive silicon steel 8 is fixed to the stator shell 7. The stator left excitation winding coil 9 is installed in the right annular groove on the stator left magnetic conductive silicon steel 8. The stator of the independent motor unit is equivalent to removing the right part from the stator of the independent motor unit in embodiment 1.

The rotor of each independent motor unit is composed of a rotor wheel hub 3, a rotor left magnetic conductive silicon steel 11, a rotor left induction excitation winding coil 10, a rotor outer torque winding coil 1 and a rotor inner torque winding coil 2. The rotor left magnetic conductive silicon steel 11 is fixed to the rotor wheel hub 3, and is also composed of eight silicon steel pieces. After installation, an air gap is formed between adjacent silicon steel pieces, which is the same as embodiment 1. However, the rotor in the present embodiment is different from the rotor in embodiment 1 in that the rotor magnetic conductive silicon steel is equivalent to the rotor left magnetic conductive silicon steel in embodiment 1. The installation manners of the rotor left induction excitation winding coil 10, the rotor outer torque winding coil 1 and the rotor inner torque winding coil 2 are the same as the installation manners in embodiment 1. The rotor is connected with the rotating shaft 4 through the rotor wheel hub 3.

Other aspects are the same as embodiment 1.

Embodiment 3: A Rotary-type Induction Servo Motor with a Constant-Output-Torque by Using Uniform Magnetic Fields (Two Independent Motor Units in the Axial Symmetrical Arrangement Form)

The rotary-type induction servo motor with a constant-output-torque by using uniform magnetic fields is the integration and simplification of embodiment 1 and embodiment 2.

The rotary-type induction servo motor with a constant-output-torque by using uniform magnetic fields is composed of a rotating shaft 4, bearings 5, end covers 6 and two independent motor units.

In embodiment 2, the motor is powered by fixed-frequency four-phase alternating current, and each phase of the four-phase alternating current powers one independent motor unit. The voltage phases of the alternating current are respectively 0°, 90°, 180° and 270°. During operation, the voltage frequency of power supply is constant. However, because the independent motor units with the voltage phases of 0° and 180° have the same output torque characteristic and the independent motor units with the voltage phases of 90° and 270° have the same output torque characteristic, the present embodiment is simplified to adopt two independent motor units. The two independent motor units are powered by two-phase alternating current, and the phase difference is 90°.

The two independent motor units adopt the axial symmetrical arrangement form. See embodiment 1 for the specific structure of each unit.

Embodiment 4: A Rotary-type Induction Servo Motor with a Constant-Output-Torque by Using Uniform Magnetic Fields (Three Independent Motor Units in the Radial One-side Arrangement Form)

The rotary-type induction servo motor with a constant-output-torque by using uniform magnetic fields is similar to the motor in embodiment 2, and a main difference is that the structure and number of the independent motor units are different. Therefore, the structure of the independent motor unit in the present embodiment are mainly introduced below.

The rotary-type induction servo motor with a constant-output-torque by using uniform magnetic fields is composed of a rotating shaft 4, bearings 5, end covers 6 and three independent motor units. The motor is powered by fixed-frequency three-phase alternating current. Each phase of the three-phase alternating current powers one independent motor unit. The voltage phases are respectively 0°, 120° and 240°. During operation, the voltage frequency of power supply is constant. The output torque of the motor is controlled by adjusting the voltage magnitude of the power supply.

Figure 13:
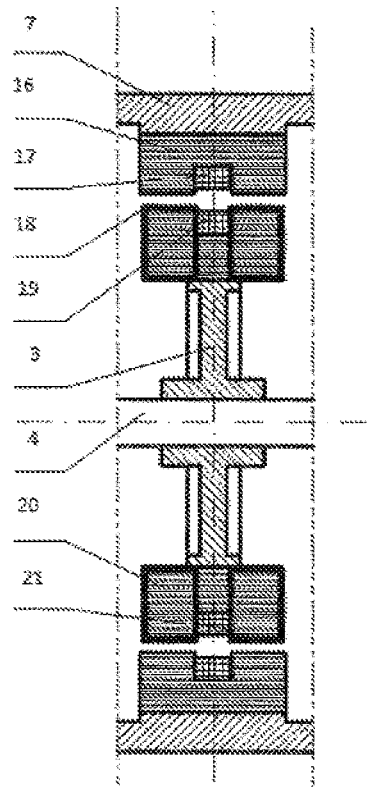
FIG. 13 shows an independent motor unit in the radial one-side arrangement form in a rotary-type induction servo motor with a constant-output-torque by using uniform magnetic fields.

Three independent motor units have the same structure. Each of them adopts the radial one-side arrangement form, as shown in FIG. 13. And FIG. 14 is a partial enlarged drawing of the independent motor unit.

The stator of each independent motor unit is composed of a stator shell 7, a stator magnetic conductive silicon steel 16 and a stator excitation winding coil 17. The stator magnetic conductive silicon steel 16 is fixed to the stator shell 7. The stator magnetic conductive silicon steel 16 is an annular column with rectangular section, and an annular groove is formed in the inner middle. The stator excitation winding coil 17 is installed in the annular groove on the stator magnetic conductive silicon steel 16, as shown in FIG. 13 and FIG. 14.

The rotor of each independent motor unit is composed of a rotor wheel hub 3, a rotor magnetic conductive silicon steel 20, a rotor induction excitation winding coil 19, a rotor left torque winding coil 18 and a rotor right torque winding coil 21. The rotor magnetic conductive silicon steel 20 is fixed to the rotor wheel hub 3, and is also composed of eight silicon steel pieces. After installation, an air gap is formed between adjacent silicon steel pieces, which is similar to embodiment 2. However, the rotor in the present embodiment is different from the rotor in embodiment 2 in that: the annular groove on the rotor magnetic conductive silicon steel 20 is in the middle of the radial outer side; meanwhile, the through grooves are also along the radial direction; two groups of annular sector columns formed on the rotor magnetic conductive silicon steel 20 are respectively located on the left side and the right side; and the structure of the rotor magnetic conductive silicon steel 20 can be approximately regarded as that the rotor magnetic conductive silicon steel in embodiment 2 is rotated by 90°.

Figure 14:
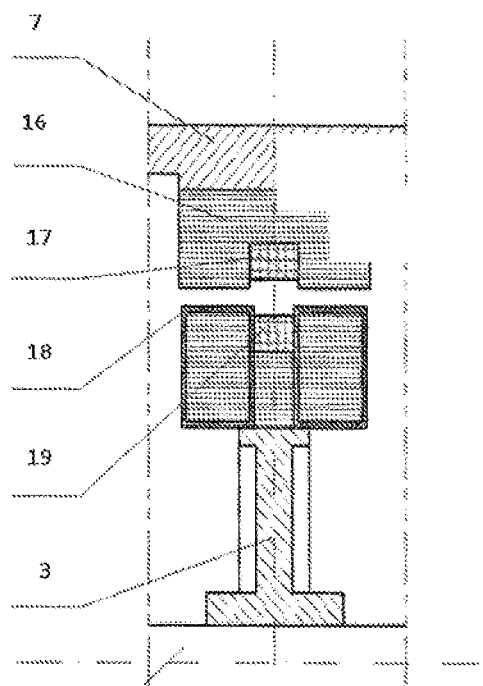
FIG. 14 is a partial enlarged drawing of an independent motor unit in the radial one-side arrangement form in a rotary-type induction servo motor with a constant-output-torque by using uniform magnetic fields.

The rotor induction excitation winding coil 19 is installed in the annular groove on the rotor magnetic conductive silicon steel 20, as shown in FIG. 13 and FIG. 14. The rotor left torque winding coil 18 and the rotor right torque winding coil 21 respectively comprise eight groups of coils, which are respectively wound on the left and the right annular sector columns of the rotor magnetic conductive silicon steel through the eight radial through grooves on the rotor magnetic conductive silicon steel 20.

Other aspects are the same as embodiment 2.

Embodiment 5: A Linear-type Induction Servo Motor with a Constant-Output-Force by Using Uniform Magnetic Fields (Three Independent Motor Units in the Symmetrical Arrangement Form)

Figure 15:
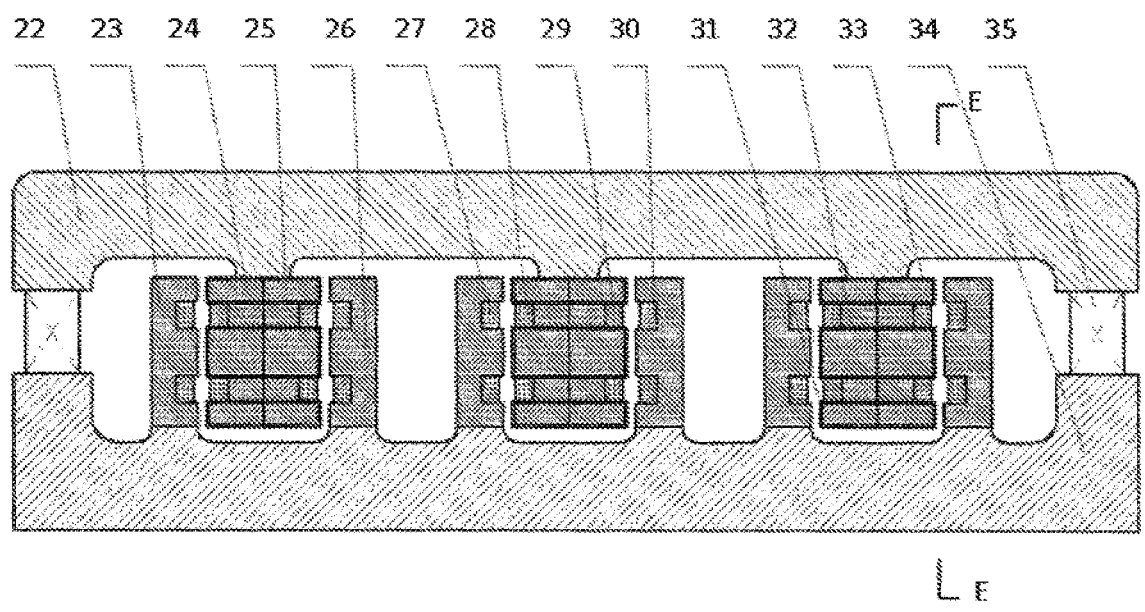
FIG. 15 shows a linear-type induction servo motor with a constant-output-force by using uniform magnetic fields (three independent motor units in the symmetrical arrangement form).

The linear-type induction servo motor with a constant-output-force by using uniform magnetic fields, as shown in FIG. 15, is mainly composed of guide rails 35 and three independent motor units. The motor is powered by fixed-frequency three-phase alternating current. Each phase of the three-phase alternating current powers one independent motor unit. The voltage phases are respectively 0°, 120° and 240°. During operation, the voltage frequency of power supply is constant. The size of the output force of the motor is controlled by adjusting the voltage magnitude of the power supply.

Three independent motor units have the same structure, as shown in FIG. 15, FIG. 16, FIG. 17 and FIG. 18. Each independent motor unit adopts the symmetrical arrangement form.

The primary part of each independent motor unit comprises a base 34, a primary left magnetic conductive silicon steel 23, a primary right magnetic conductive silicon steel 26, a primary left excitation winding coil 27 and a primary right excitation winding coil 30, as shown FIG. 15. The primary left magnetic conductive silicon steel 23 and the primary right magnetic conductive silicon steel 26 are fixedly connected to the base 34.

Figure 16:
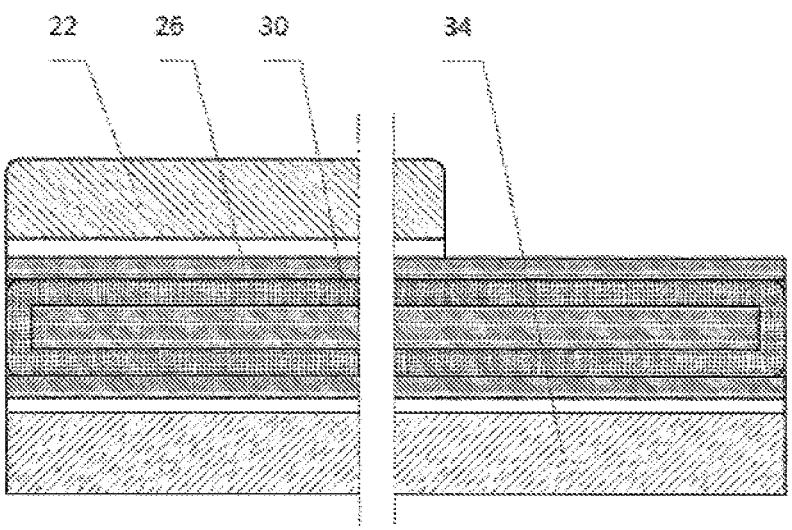
FIG. 16 is an sectional view of a linear-type induction servo motor with a constant-output-force by using uniform magnetic fields.

The primary left magnetic conductive silicon steel 23 and the primary right magnetic conductive silicon steel 26 are long columns with rectangular section. An annular groove is formed at one side of the primary magnetic conductive silicon steel for installing primary excitation winding coils. The annular groove on the primary left magnetic conductive silicon steel 23 is formed on the right side, and the annular groove on the primary right magnetic conductive silicon steel 26 is formed on the left side. The primary left excitation winding coil 27 and the primary right excitation winding coil 30 are respectively installed in the annular grooves on the primary left magnetic conductive silicon steel 23 and the primary right magnetic conductive silicon steel 26, as shown in FIG. 15 and FIG. 16.

The secondary part of each independent motor unit comprises a mobile piece 22, a secondary left magnetic conductive silicon steel 24, a secondary right magnetic conductive silicon steel 25, a secondary left induction excitation winding coil 28, a secondary right induction excitation winding coil 29, secondary lower output force winding coils 31, secondary middle output force winding coils 32, secondary upper output force winding coils 33 and secondary end magnetic yokes 36, as shown in FIG. 15. The secondary left magnetic conductive silicon steel 24 and the secondary right magnetic conductive silicon steel 25 are fixedly connected to the mobile piece 22.

Figure 17:
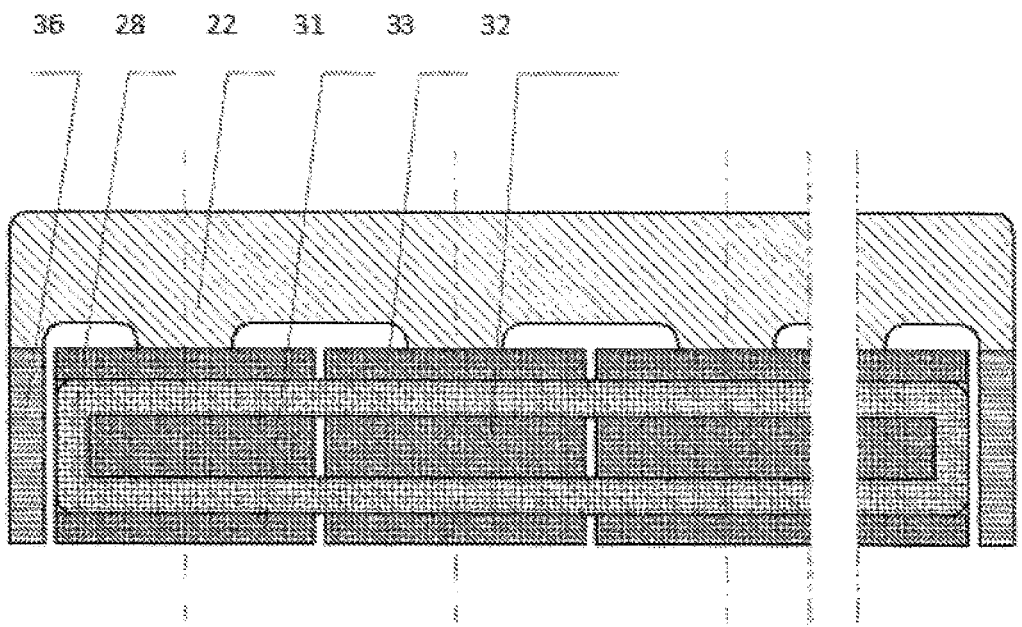
FIG. 17 is a sectional view of secondary output force winding coils and a mobile piece of a linear-type induction servo motor with a constant-output-force by using uniform magnetic fields.
Figure 18:
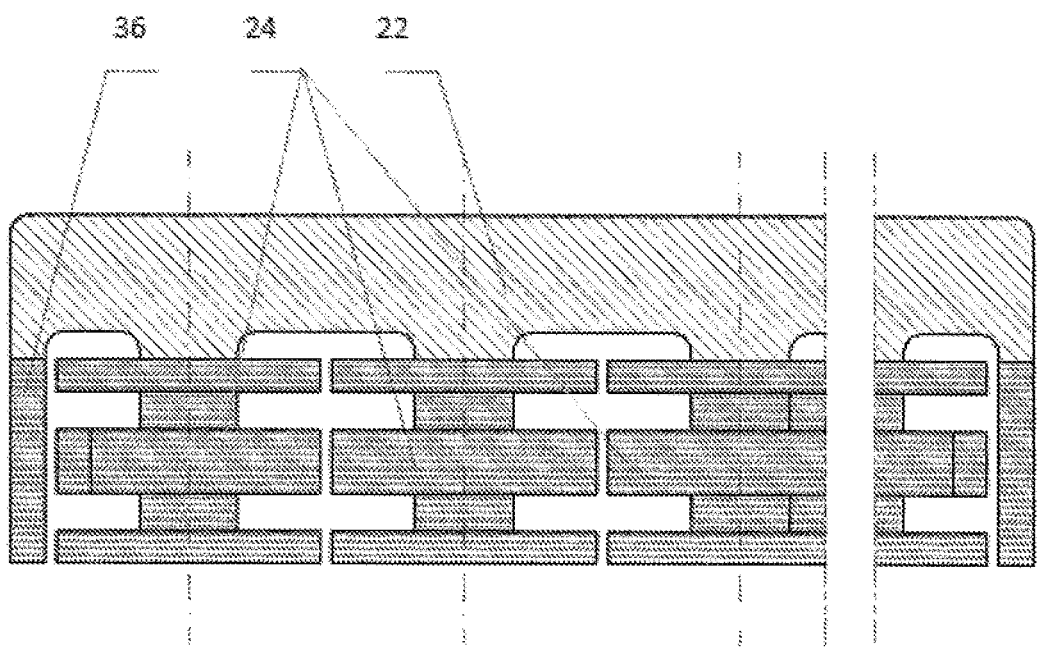
FIG. 18 is a sectional view of a secondary magnetic conductive silicon steel and a mobile piece of a linear-type induction servo motor with a constant-output-force by using uniform magnetic fields.

The secondary left magnetic conductive silicon steel 24 and the secondary right magnetic conductive silicon steel 25 have the similar structures. Both are composed of ten silicon steel pieces, respectively. And a main difference between them is that the annular grooves for installing the induction excitation winding coils are at different sides, as shown in FIG. 15. Each silicon steel piece can be geometrically regarded as being formed by vertically superposing five cuboids, wherein an upper cuboid and a lower cuboid on the outermost side have the same size. Compared with the two cuboids on the outermost side, a center cuboid has a larger thickness, but other sizes are same. The rest two cuboids in the middle have smaller widths, and they connect three cuboids including the upper cuboid, the center cuboid and the lower cuboid. The silicon steel piece looks like a Chinese character "王". However, because the two middle cuboids have smaller lengths and smaller width, four through grooves are formed in the silicon steel pieces, as shown in FIG. 18. The four through grooves are used for installing three groups of upper, middle and lower output three winding coils. Meanwhile, because the two middle cuboids have smaller widths, two grooves are formed at one side of the silicon steel pieces. When ten silicon steel pieces are arranged in a linear line and installed on the mobile piece 22, the grooves form annular grooves for installing the induction excitation winding coils on the whole, as shown in FIG. 17. An air gap is reserved between adjacent silicon steel pieces of the secondary left magnetic conductive silicon steel 24 and the secondary right magnetic conductive silicon steel 25, as shown in FIG. 17 and FIG. 18.

The secondary left induction excitation winding coil 28 and the secondary right induction excitation winding coil 29 are respectively installed in the annular grooves on the secondary left magnetic conductive silicon steel 24 and the secondary right magnetic conductive silicon steel 25, and respectively couple with the primary left excitation winding coil 27 and the primary right excitation winding coil 30, as shown in FIG. 15. The secondary upper output force winding coils 33, the secondary middle output force winding coils 32 and the secondary lower output force winding coils 31 respectively comprise ten groups of coils, which are wound on three rectangular sectional columns on the outermost side and in the center of each silicon steel piece through the through grooves on the secondary left magnetic conductive silicon steel and the secondary right magnetic conductive silicon steel, as shown in FIG. 15, FIG. 17 and FIG. 18. And FIG. 17 is an arrangement diagram of the secondary upper output force winding coils 33, the secondary middle output force winding coils 32, the secondary lower output force winding coils 31 and the mobile piece 22. FIG. 18 is an arrangement diagram of the secondary left magnetic conductive silicon steel 24, the mobile piece 22 and the secondary end magnetic yoke 36. FIG. 17 and FIG. 18 show relationships between the secondary output force winding coils and five cuboids of each silicon steel piece forming the secondary left magnetic conductive silicon steel. The winding direction of the secondary output force winding coils 31, 32 and 33 is perpendicular to the winding direction of the secondary induction excitation winding coils 28 and 29 in space.

An air gap is reserved between the primary part and the secondary part in each independent motor unit. After connected in series, the secondary left induction excitation winding coil 28 and the secondary right induction excitation winding coil 29 are connected with the secondary upper output force winding coils 33, the secondary middle output force winding coils 32 and the secondary lower output force winding coils 31. The primary magnetic conductive silicon steel, the secondary magnetic conductive silicon steel and the secondary end magnetic yokes are formed by superimposing silicon steel sheets.

Embodiment 6: A Linear-Type Induction Servo Motor with a Constant-Output-Force by Using Uniform Magnetic Fields (Three Independent Motor Units in the Symmetrical Arrangement Form)

The primary part and the secondary part in embodiment 5 are exchanged, and a structure with a long-primary and a short-secondary is kept.

We claim:

1. A rotary-type induction servo motor with a constant-output-torque by using uniform magnetic fields, wherein,
   the servo motor is structurally composed of N independent motor units; each independent motor unit has the same structure, when the N independent motor units are arranged in the same plane perpendicular to the rotating shaft of the motor, the structural sizes of the N independent motor units are different; the servo motor is powered by N-phase alternating current, and the N phases form an arithmetic progression with a common difference of 360°/N or 180°/N; each unit of the N independent motor units is only connected with one-phase alternating current of the N-phase alternating current, which means, each independent motor unit is powered by a single-phase alternating current;
   in each independent motor unit, the stator magnetic conductive silicon steel is symmetrical in structure, and its symmetric axis is the rotating shaft of the motor; the stator excitation winding coil is uniformly arranged on the stator magnetic conductive silicon steel, and is symmetric about the rotating shaft of the motor; an air gap is reserved between the stator magnetic conductive silicon steel and the rotor magnetic conductive silicon steel; a magnetic field uniformly distributed along the circumference of the motor rotor is generated in the air gap;
   in each independent motor unit, the rotor magnetic conductive silicon steel adopts a structure type with a plurality of radial air gaps uniformly distributed along the circumference; two kinds of winding coils are wound on the rotor magnetic conductive silicon steel, and one is the rotor induction excitation winding coil and the other is the rotor torque winding coil; the rotor induction excitation winding coil and the rotor torque winding coil are orthogonal in the winding direction; the rotor torque winding coil and the rotor induction excitation winding coil are directly connected; the installation position of the rotor induction excitation winding coil corresponds to the installation position of the stator excitation winding coil;
   each independent motor unit comprises two parts: a stator and a rotor;
   the stator is composed of a stator shell, stator magnetic conductive silicon steels and stator excitation winding coils; the stator magnetic conductive silicon steel is an annular column with an annular groove; the stator excitation winding coil is powered by the single-phase alternating current, and is installed in the annular groove on the stator magnetic conductive silicon steel; the stator excitation winding coil is a long annular coil with an axis coinciding with the motor axis, or comprises a plurality of groups of short coils uniformly distributed along the circumference of the stator magnetic conductive silicon steel; the stator shell and the stator magnetic conductive silicon steel are fixedly connected, and are kept fixed when the motor is operated;

the rotor is composed of a rotor wheel hub, rotor magnetic conductive silicon steels, rotor induction excitation winding coils and rotor torque winding coils; the rotor magnetic conductive silicon steel is formed by uniformly arranging M silicon steel pieces along the circumference; each silicon steel piece has the same shape, and an air gap is reserved between adjacent silicon steel pieces; each silicon steel piece has a groove in a circumferential direction so that an annular groove is formed on the whole on the rotor magnetic conductive silicon steel; the position of the annular groove corresponds to the annular groove for installing the stator excitation winding coil on the stator magnetic conductive silicon steel; the groove on each silicon steel piece is formed on the inner or outer surface or is formed on the end surfaces; each silicon steel piece also has a through groove in the middle, and the direction of the through groove is vertical with the direction of the annular groove; the through groove is formed in a radial direction or an axial direction and is used for installing the rotor torque winding coil; the rotor induction excitation winding coil is installed in the annular groove on the rotor magnetic conductive silicon steel; the rotor torque coil is wound on the rotor magnetic conductive silicon steel through the through grooves on the M silicon steel pieces; the rotor magnetic conductive silicon steels are fixedly connected to the rotor wheel hub, and the rotor magnetic conductive silicon steels, the rotor wheel hub and the rotating shaft rotate together when the motor is operated;

in the independent motor unit of the rotary-type induction servo motor with a constant-output-torque by using uniform magnetic fields: a uniform air gap is reserved between the stator and the rotor to form magnetic resistance; the stator magnetic conductive silicon steel and the rotor magnetic conductive silicon steel are formed by superimposing silicon steel sheets; the stator excitation winding coil is installed in the annular groove on the stator magnetic conductive silicon steel, and is symmetric about the rotating shaft of the motor; when a long annular coil with multilayer solenoid type is adopted as the stator excitation winding coil, the axis of the long annular coil coincides with the stator axis and the rotor axis; when a combination of a plurality of groups of short coils with multilayer solenoid type is adopted as the stator excitation winding coil, axes of the short coils are uniformly distributed along the circumference of the stator magnetic conductive silicon steel; the rotor structure has symmetry; two kinds of winding coils including the rotor induction excitation winding coil and the rotor torque winding coil, are installed on the rotor magnetic conductive silicon steel; the winding directions of the rotor torque winding coil and the rotor induction excitation winding coil are orthogonal in space; the magnetic field line directions of magnetic fields generated by the two kinds of winding coils are orthogonal in space; the rotor torque winding coil and the rotor induction excitation winding coil are directly connected; the rotor induction excitation winding coil and the stator excitation winding coil produce mutual inductance to provide current for the rotor torque winding coil; in each independent motor unit, the single-phase alternating voltage is applied to the stator excitation winding coil, and the structure form of the independent motor unit determines that the stator excitation magnetic field is equivalent to a magnetic field generated by annular winding coils with multilayer solenoid type; a magnetic field uniformly distributed along the circumference is generated in the uniform air gap between the stator magnetic conductive silicon steel and the rotor magnetic conductive silicon steel; in the uniform magnetic field, the magnetic field line direction is unchanged, and the magnetic field of each point changes with the applied voltage; a rotating magnetic field or travelling wave magnetic field is not produced in the stator magnetic conductive silicon steel and the air gap.

2. The rotary-type induction servo motor with a constant-output-torque by using uniform magnetic fields according to claim 1, wherein, the structural forms of the independent motor unit comprise:

(1) the independent motor unit in the axial one-side arrangement form the stator comprises a stator magnetic conductive silicon steel; along the direction of a motor rotating shaft, the stator magnetic conductive silicon steel is arranged on a left side or a right side of the rotor; when the stator magnetic conductive silicon steel is on the left side, the annular groove on the stator magnetic conductive silicon steel is on the right side; when the stator magnetic conductive silicon steel is on the right side, the annular groove on the stator magnetic conductive silicon steel is on the left side; The stator excitation winding coil is installed in the annular groove of the stator magnetic conductive silicon steel;

the rotor comprises a rotor magnetic conductive silicon steel; the rotor magnetic conductive silicon steel consists of M silicon steel pieces; each silicon steel piece is formed by connecting a plurality of annular sector columns along the radial direction; each annular sector column has the rectangular section and the equal angle of sector; one or more bodies connect adjacent annular sector columns; the connecting body has small sizes including a small axial thickness and a small angle of sector; relative to the rotor axis, annular sector columns are arranged on an inner side and an outer side of each silicon steel piece; in the middle of each silicon steel piece, the connecting bodies with small sizes and the annular sector column are alternately arranged; M silicon steel pieces are uniformly arranged along the circumference, and a plurality of annular sector columns form a plurality of annular columns having M gaps along the circumference; a plurality of through grooves along the rotor axial direction are formed by the connecting bodies between two adjacent annular columns, and the annular grooves along the circumferential direction are also formed; the rotor induction excitation winding coils are installed in the annular grooves; the rotor torque winding coils are wound on the annular columns of the rotor magnetic conductive silicon steel through the through grooves, and a plurality of groups of rotor inner and outer torque winding coils are formed;

(2) the independent motor unit in the axial symmetrical arrangement form the stator comprises two stator magnetic conductive silicon steels; the two stator magnetic conductive silicon steels are respectively arranged on a left side and a right side of the rotor, and are respectively called as a stator left magnetic conductive silicon steel and a stator right magnetic conductive silicon steel; the annular groove in the stator left magnetic conductive silicon steel is on the right side, and the annular groove in the stator right magnetic conductive silicon steel is on the left side; the stator in the axial symmetrical arrangement form is equivalent to a combination of two stators in the axial one-side arrangement form; two groups of stator excitation winding coils are installed in the annular grooves on the stator left magnetic conductive silicon steel and the stator right magnetic conductive silicon steel, respectively;

the rotor comprises two rotor magnetic conductive silicon steels; the rotor in the axial symmetrical arrangement form is equivalent to a combination of two rotors in the axial one-side arrangement form; the two rotor magnetic conductive silicon steels are jointly installed on one rotor wheel hub and form a mirror image relationship relative to the rotor wheel hub's symmetric plane perpendicular to the rotor axis; the two rotor magnetic conductive silicon steels are called as a rotor left magnetic conductive silicon steel and a rotor right magnetic conductive silicon steel, respectively; on the rotor left magnetic conductive silicon steel, the annular groove for installing the rotor left induction excitation winding coil is on the left side, and corresponds to the annular groove on the stator left magnetic conductive silicon steel for installing the stator left excitation winding coil; on the rotor right magnetic conductive silicon steel, the annular groove for installing the rotor right induction excitation winding coil is on the right side, and corresponds to the annular groove on the stator right magnetic conductive silicon steel for installing the stator right excitation winding coil; two groups of rotor induction excitation winding coils are installed in the annular grooves on the rotor left magnetic conductive silicon steel and the rotor right magnetic conductive silicon steel, respectively; the rotor torque winding coils are respectively wound on the rotor left magnetic conductive silicon steel and the rotor right magnetic conductive silicon steel through the through grooves among the plurality of annular columns, to form a plurality of groups of rotor inner and outer torque winding coils;

(3) the independent motor unit in the radial one-side arrangement form the stator comprises a stator magnetic conductive silicon steel; relative to the rotor axis, the stator magnetic conductive silicon steel is arranged on an inner side or an outer side of the rotor; when the stator magnetic conductive silicon steel is on the outer side, the annular groove on the stator magnetic conductive silicon steel is on the inner side; when the stator magnetic conductive silicon steel is on the inner side, the annular groove on the stator magnetic conductive silicon steel is on the outer side;

the rotor comprises a rotor magnetic conductive silicon steel; the rotor magnetic conductive silicon steel consists of M silicon steel pieces; each silicon steel piece is formed by connecting a plurality of annular sector columns along the axial direction; each annular sector column has the rectangular section and the equal angle of sector; one or more bodies connect adjacent annular sector columns; the connecting body has small sizes including a small radial thickness and a small angle of sector; along the rotor axis, annular sector columns are arranged on the left side and the right side of each silicon steel piece; in the middle of the silicon steel piece, the connecting bodies with small sizes and the annular sector column are alternately arranged; after M silicon steel pieces are uniformly arranged on the wheel hub along the circumference, a plurality of annular sector columns form a plurality of annular columns having M gaps along the circumference; a plurality of through grooves along the radial direction are formed by the connecting bodies between two adjacent annular columns, and the annular grooves along the circumferential direction are formed at the outer side or the inner side; the rotor induction excitation winding coils are installed in the annular grooves; the rotor torque winding coils are respectively wound on the rotor magnetic conductive silicon steel through the through grooves among the plurality of annular columns, and rotor left torque winding coils, rotor middle torque winding coils and rotor right torque winding coils are formed;

(4) the independent motor unit in the radial symmetrical arrangement form the stator comprises two stator magnetic conductive silicon steels; relative to the rotor axis, the two stator magnetic conductive silicon steels are respectively arranged on an inner side and an outer side of the rotor, and are respectively called as a stator inner magnetic conductive silicon steel and a stator outer magnetic conductive silicon steel; the annular groove on the stator inner magnetic conductive silicon steel is on the outer side, and the annular groove on the stator outer magnetic conductive silicon steel is on the inner side; the stator in the radial symmetrical arrangement form is equivalent to a combination of two stators in the radial one-side arrangement form; two groups of stator excitation winding coils are respectively installed in the annular grooves on the stator inner magnetic conductive silicon steel and the stator outer magnetic conductive silicon steel;

a motor with a rotor in the radial symmetrical arrangement form belongs to a double-stator motor having outer and inner stators, and the structure of the rotor in an independent motor unit needs to be designed into a cup type; the rotor comprises two rotor magnetic conductive silicon steels; the rotor in the radial symmetrical arrangement form is equivalent to a combination of two rotors in the radial one-side arrangement form; the two rotor magnetic conductive silicon steels are installed on an inner side and an outer side of a rotor cup and are called as a rotor inner magnetic conductive silicon steel and a rotor outer magnetic conductive silicon steel, respectively; the silicon steel pieces of the rotor inner magnetic conductive silicon steel and the rotor outer magnetic conductive silicon steel have the same number and the same radial symmetric plane; on the rotor outer magnetic conductive silicon steel, the annular groove for installing the rotor outer induction excitation winding coil is on the outer side; and on the rotor inner magnetic conductive silicon steel, the annular groove for installing the rotor inner induction excitation winding coil is on the inner side; the annular grooves on the rotor inner magnetic conductive silicon steel and the rotor outer magnetic conductive silicon steel respectively correspond to the annular grooves on the stator inner magnetic conductive silicon steel and the stator outer magnetic conductive silicon steel; two groups of rotor induction excitation winding coils are respectively installed in the annular grooves on the rotor inner magnetic conductive silicon steel and the rotor outer magnetic conductive silicon steel; the rotor torque winding coils are respectively wound on the rotor inner magnetic conductive silicon steel and the rotor outer magnetic conductive silicon steel through the through grooves among the plurality of annular columns, to form rotor left torque winding coils, rotor middle torque winding coils and rotor right torque winding coils;

(5) the independent motor units in the combined arrangement forms the combined arrangement forms specifically comprise: a combination of the axial one-side arrangement form and the axial one-side arrangement form, a combination of the axial one-side arrangement form and the axial symmetrical arrangement form, a combination of the axial one-side arrangement form and the radial one-side arrangement form, a combination of the axial one-side arrangement form and the radial symmetrical arrangement form, a combination of the axial symmetrical arrangement form and the axial symmetrical arrangement form, a combination of the axial symmetrical arrangement form and the radial one-side arrangement form, a combination of the axial symmetrical arrangement form and the radial symmetrical arrangement form, a combination of the radial one-side arrangement form and the radial one-side arrangement form, a combination of the radial one-side arrangement form and the radial symmetrical arrangement form and a combination of the radial symmetrical arrangement form and the radial symmetrical arrangement form.

3. The rotary-type induction servo motor with a constant-output-torque by using uniform magnetic fields according to claim 1, wherein, arrangement forms of a plurality of independent motor units comprise:

(1) a plurality of independent motor units are arranged along the direction of the rotating shaft of the motor, and are connected through the rotating shaft;

(2) in accordance with different radiuses, a plurality of independent motor units are arranged in the same plane perpendicular to the rotating shaft of the motor so as to form a disc type motor; and (3) a plurality of independent motor units are grouped; firstly, the independent motor units in each group are arranged in the same plane perpendicular to the rotating shaft of the motor in accordance with different radiuses, and are connected to form a disc type structure;

then, a plurality of groups of independent motor units are arranged along the direction of the rotating shaft of the motor, and are connected through the rotating shaft.

4. The rotary-type induction servo motor with a constant-output-torque by using uniform magnetic fields according to claim 3, wherein, measures for realizing control over an output torque comprise:

(1) in an operation manner that the frequency of applied alternating voltage is constant, the output torque is controlled only by adjusting the voltage magnitude;

(2) in an operation manner that the magnitude of applied alternating voltage is constant, the output torque is controlled only by adjusting the voltage frequency; and (3) the output torque is controlled by adjusting the magnitude or frequency of the applied voltage; an important feature is that: when the motor is operated in the operation manner that the frequency of applied alternating voltage is constant, under the conditions that the magnetic induction intensity of the stator magnetic conductive silicon steel and the rotor magnetic conductive silicon steel is unsaturated and the resistance of winding coils is neglected, the output torque of the motor is in direct proportion to the magnitude of the applied voltage and is irrelevant to the rotating speed of the motor.

5. The rotary-type induction servo motor with a constant-output-torque by using uniform magnetic fields according to claim 4, wherein, three measures are taken to realize forward driving and reverse driving:

(1) two groups of independent motor units are adopted in the motor; one group realizes forward driving, and the other group realizes reverse driving;

(2) in the independent motor unit, an electromagnetic switch is added to exchange connecting wires of the winding coils in the rotor; and meanwhile, an induction control apparatus is added to realize control over the electromagnetic switch; and (3) for the independent motor unit in the symmetrical arrangement form, in order to change the current phases of the rotor torque winding coils and realize forward and reverse driving of the motor, two groups of rotor induction excitation winding coils are reversely connected in series to supply power for the rotor torque winding coils, and meanwhile, relative magnitudes of the applied voltage on the stator excitation winding coils are adjusted.

6. The rotary-type induction servo motor with a constant-output-force or a constant-output-torque by using uniform magnetic fields according to claim 3, wherein, three measures are taken to realize forward driving and reverse driving:

(1) two groups of independent motor units are adopted in the motor; one group realizes forward driving, and the other group realizes reverse driving;

(2) in the independent motor unit, an electromagnetic switch is added to exchange connecting wires of the winding coils in the rotor; and meanwhile, an induction control apparatus is added to realize control over the electromagnetic switch; and (3) for the independent motor unit in the symmetrical arrangement form, in order to change the current phases of the rotor torque winding coils and realize forward and reverse driving of the motor, two groups of rotor induction excitation winding coils are reversely connected in series to supply power for the rotor torque winding coils, and meanwhile, relative magnitudes of the applied voltage on the stator excitation winding coils are adjusted.

7. The rotary-type induction servo motor with a constant-output-torque by using uniform magnetic fields according to claim 3, wherein, the stator excitation winding coil and the rotor induction excitation winding coil comprise three structure forms:

(1) the stator magnetic conductive silicon steel or the rotor magnetic conductive silicon steel is regarded as a whole, respectively; a long annular coil with multilayer solenoid type is used as the stator excitation winding coil or the rotor induction excitation winding coil and is installed along the whole of the stator magnetic conductive silicon steel or the rotor magnetic conductive silicon steel;

(2) the stator magnetic conductive silicon steel or the rotor magnetic conductive silicon steel is divided into a plurality of parts, respectively; a combination of a plurality of groups of short coils with multilayer solenoid type is used as the stator excitation winding coil or the rotor induction excitation winding coil, and the short coils are installed independently along each part of the stator magnetic conductive silicon steel or the rotor magnetic conductive silicon steel; and (3) the stator excitation winding coil and the rotor induction excitation winding coil adopt a combined form of (1) and (2).

8. The rotary-type induction servo motor with a constant-output-torque by using uniform magnetic fields according to claim 1, wherein, measures for realizing control over an output torque comprise:

(1) in an operation manner that the frequency of applied alternating voltage is constant, the output torque is controlled only by adjusting the voltage magnitude;

(2) in an operation manner that the magnitude of applied alternating voltage is constant, the output torque is controlled only by adjusting the voltage frequency; and (3) the output torque is controlled by adjusting the magnitude or frequency of the applied voltage; an important feature is that: when the motor is operated in the operation manner that the frequency of applied alternating voltage is constant, under the conditions that the magnetic induction intensity of the stator magnetic conductive silicon steel and the rotor magnetic conductive silicon steel is unsaturated and the resistance of winding coils is neglected, the output torque of the motor is in direct proportion to the magnitude of the applied voltage and is irrelevant to the rotating speed of the motor.

9. The rotary-type induction servo motor with a constant-output-torque by using uniform magnetic fields according to claim 8, wherein, three measures are taken to control the current magnitude in the rotor torque winding coil:

(1) the size of the air gap between adjacent silicon steel pieces forming the rotor magnetic conductive silicon steel is adjusted;

(2) the magnetic resistance between adjacent silicon steel pieces forming the rotor magnetic conductive silicon steel is adjusted; and (3) the number of turns of the rotor induction excitation winding coil is adjusted.

10. The rotary-type induction servo motor with a constant-output-torque by using uniform magnetic fields according to claim 1, wherein, three measures are taken to realize forward driving and reverse driving:

(1) two groups of independent motor units are adopted in the motor; one group realizes forward driving, and the other group realizes reverse driving;

(2) in the independent motor unit, an electromagnetic switch is added to exchange connecting wires of the winding coils in the rotor; and meanwhile, an induction control apparatus is added to realize control over the electromagnetic switch; and (3) for the independent motor unit in the symmetrical arrangement form, in order to change the current phases of the rotor torque winding coils and realize forward and reverse driving of the motor, two groups of rotor induction excitation winding coils are reversely connected in series to supply power for the rotor torque winding coils, and meanwhile, relative magnitudes of the applied voltage on the stator excitation winding coils are adjusted.

11. The rotary-type induction servo motor with a constant-output-torque by using uniform magnetic fields according to claim 1, wherein, the stator excitation winding coil and the rotor induction excitation winding coil comprise three structure forms:

(1) the stator magnetic conductive silicon steel or the rotor magnetic conductive silicon steel is regarded as a whole, respectively; a long annular coil with multilayer solenoid type is used as the stator excitation winding coil or the rotor induction excitation winding coil and is installed along the whole of the stator magnetic conductive silicon steel or the rotor magnetic conductive silicon steel;

(2) the stator magnetic conductive silicon steel or the rotor magnetic conductive silicon steel is divided into a plurality of parts, respectively; a combination of a plurality of groups of short coils with multilayer solenoid type is used as the stator excitation winding coil or the rotor induction excitation winding coil, and the short coils are installed independently along each part of the stator magnetic conductive silicon steel or the rotor magnetic conductive silicon steel; and (3) the stator excitation winding coil and the rotor induction excitation winding coil adopt a combined form of (1) and (2).

12. The rotary-type induction servo motor with a constant-output-torque by using uniform magnetic fields according to claim 1, wherein, three measures are taken to control the current magnitude in the rotor torque winding coil:

(1) the size of the air gap between adjacent silicon steel pieces forming the rotor magnetic conductive silicon steel is adjusted;

(2) the magnetic resistance between adjacent silicon steel pieces forming the rotor magnetic conductive silicon steel is adjusted; and (3) the number of turns of the rotor induction excitation winding coil is adjusted.

13. A linear-type induction servo motor with a constant-output-force by using uniform magnetic fields, wherein, the servo motor is structurally composed of N independent motor units, and each independent motor unit has the same structure; the motor is powered by N-phase alternating current, and the N phases form an arithmetic progression with common difference of 360°/N or 180°/N; in the motor, each independent motor unit is only connected with one-phase alternating current of the N-phase alternating current;

in each independent motor unit, the primary magnetic conductive silicon steel adopts a linear structure form; the primary excitation winding coil is installed at one side of the primary magnetic conductive silicon steel, and is adjacent to the secondary magnetic conductive silicon steel; the primary excitation winding coil is uniformly distributed along the primary magnetic conductive silicon steel; when the motor is operated, in each independent motor unit, one-phase alternating voltage is applied to the primary excitation winding coil, and a magnetic field uniformly distributed along the linear direction of the primary magnetic conductive silicon steel is generated in the uniform air gap between the primary magnetic conductive silicon steel and the secondary magnetic conductive silicon steel;

in each independent motor unit, the secondary magnetic conductive silicon steel adopts a linear structure form with a plurality of gaps perpendicular to the linear direction of the secondary magnetic conductive silicon steel; two kinds of winding coils are wound on the secondary magnetic conductive silicon steel, and one is the secondary induction excitation winding coil and the other is the secondary output force winding coil; the two kinds of winding coils are orthogonal in the winding direction; the secondary output force winding coil and the secondary induction excitation winding coil are directly connected; the installation position of the primary excitation winding coil corresponds to the installation position of the secondary induction excitation winding coil; the primary excitation winding coil and the secondary induction excitation winding coil produce mutual inductance to provide current for the secondary output force winding coil;

each independent motor unit comprises two parts: a primary part and a secondary part;

the primary part is composed of a base, primary magnetic conductive silicon steels and primary excitation winding coils; the primary magnetic conductive silicon steel is a linear structure with an annular groove; the primary excitation winding coil is powered by the single-phase alternating current, and is installed in the annular groove on the primary magnetic conductive silicon steel; the primary excitation winding coil adopts a simple winding manner similar to a solenoid type; when a long coil is adopted as the primary excitation winding coil, the long coil is installed along the overall length of the primary magnetic conductive silicon steel; when a combination of a plurality of groups of short coils is adopted as the primary excitation winding coil, the primary magnetic conductive silicon steel is divided into a plurality of parts and the short coils are independently installed on each part of the primary magnetic conductive silicon steel; the primary magnetic conductive silicon steels are fixedly connected to the base, and the primary magnetic conductive silicon steels and the base are kept fixed when the motor is operated;

the secondary part is composed of a mobile piece, secondary magnetic conductive silicon steels, secondary induction excitation winding coils, secondary output force winding coils and secondary end magnet yokes; the secondary magnetic conductive silicon steel is formed by arranging M silicon steel pieces with the same shape along a linear line; an air gap is formed between adjacent silicon steel pieces; the secondary magnetic conductive silicon steel forms a linear structure having a plurality of gaps along the linear line on the whole; at a side adjacent to the primary magnetic conductive silicon steel, each silicon steel piece forming the secondary magnetic conductive silicon steel has a groove; on the whole, an annular groove is formed at one side of the secondary magnetic conductive silicon steel; the position of the annular groove on the secondary magnetic conductive silicon steel corresponds to the annular groove for installing the primary excitation winding coil on the primary magnetic conductive silicon steel; on each silicon steel piece forming the secondary magnetic conductive silicon steel, a through groove used for installing the secondary output force winding coil is also formed; directions of the through groove and the annular groove are mutually vertical; the direction of the through groove is horizontal or vertical, depending on installation and arrangement manners of the primary magnetic conductive silicon steel and the secondary magnetic conductive silicon steel; the secondary induction excitation winding coil is installed in the annular groove on the secondary magnetic conductive silicon steel, and adopts a simple winding manner similar to a solenoid type; when a long coil is adopted as the secondary induction excitation winding coil, the long coil is installed along the overall length of the secondary magnetic conductive silicon steel; when a combination of a plurality of groups of short coils is adopted as the secondary induction excitation winding coil, the secondary magnetic conductive silicon steel is divided into a plurality of parts, and the short coils are independently installed on each part of the secondary magnetic conductive silicon steel; the secondary output force winding coil is wound on each silicon steel piece of the secondary magnetic conductive silicon steel through the through grooves on the secondary magnetic conductive silicon steel; the secondary magnetic conductive silicon steels are fixedly connected to the mobile piece; the secondary end magnetic yokes are installed on both ends of the secondary magnetic conductive silicon steels and also fixedly connected to the mobile piece;

in the independent motor unit of the linear-type induction servo motor with a constant-output-force by using uniform magnetic fields: a uniform air gap is formed between the primary part and the secondary part to form magnetic resistance; the primary magnetic conductive silicon steel, the secondary magnetic conductive silicon steel and the secondary end magnetic yokes are formed by superimposing silicon steel sheets; the primary excitation winding coil is installed on the primary magnetic conductive silicon steel, and is uniformly distributed along the lengthwise direction of the primary magnetic conductive silicon steel; two kinds of winding coils, the secondary induction excitation winding coil and the secondary output force winding coil, are installed on the secondary magnetic conductive silicon steel; the winding directions of the secondary output force winding coil and the secondary induction excitation winding coil are perpendicular, and the magnetic field line directions of magnetic fields generated by the two kinds of winding coils are orthogonal in space; the secondary output force winding coil and the secondary induction excitation winding coil are connected; the primary excitation winding coil and the secondary induction excitation winding coil produce mutual inductance to provide current for the secondary output force winding coil;

in each independent motor unit, the single-phase alternating voltage is applied to the primary excitation winding coil, and the structure form of the independent motor unit determines that a magnetic field uniformly distributed along the linear line is generated in the uniform air gap between the primary magnetic conductive silicon steel and the secondary magnetic conductive silicon steel; in the uniform magnetic field, the magnetic field line direction is unchanged, and the magnetic field of each point changes with the applied voltage; a rotating magnetic field or travelling wave magnetic field is not produced in the primary magnetic conductive silicon steel and the air gap.

14. The linear-type induction servo motor with a constant-output-force by using uniform magnetic fields according to claim 13, wherein, the structural forms of the independent motor unit comprise:

(1) the independent motor unit in the one-side arrangement form the primary part comprises a primary magnetic conductive silicon steel; the primary magnetic conductive silicon steel is arranged on one side of the secondary part, and the annular groove on the primary magnetic conductive silicon steel is formed at one side near the secondary part;

the secondary part comprises a secondary magnetic conductive silicon steel; the secondary magnetic conductive silicon steel consists of M silicon steel pieces; each silicon steel piece is formed by connecting a plurality of cuboid columns; or more bodies connect adjacent cuboid columns; each connecting body has small sizes so as to form through grooves between two adjacent cuboid columns and long grooves at one side of the silicon steel piece; when M silicon steel pieces are arranged in a linear line and installed on the mobile piece, long grooves are formed at one side of the secondary magnetic conductive silicon steel and a plurality of through grooves perpendicular to the long grooves are formed on the secondary magnetic conductive silicon steel; the secondary induction excitation winding coils are installed in the long grooves of the secondary magnetic conductive silicon steel; the secondary output force winding coils are wound on the cuboid columns of each silicon steel piece through the through grooves on the secondary magnetic conductive silicon steel;

(2) the independent motor unit in the symmetrical arrangement form the primary part comprises two primary magnetic conductive silicon steels; the two primary magnetic conductive silicon steels are simultaneously arranged on both sides of the secondary part, and are respectively called as a primary left magnetic conductive silicon steel and a primary right magnetic conductive silicon steel; the annular grooves on the primary left magnetic conductive silicon steel or the primary right magnetic conductive silicon steel are formed at one side near the secondary part; the primary part in the symmetrical arrangement form is equivalent to a combination of two primary parts in the one-side arrangement form;

the secondary part comprises two secondary magnetic conductive silicon steels, and is equivalent to a combination of two secondary parts in the one-side arrangement form; the two secondary magnetic conductive silicon steel are jointly installed on one mobile piece, and are respectively called as a secondary left magnetic conductive silicon steel and a secondary right magnetic conductive silicon steel; relative to a bonding surface of the two magnetic conductive silicon steels, the two secondary magnetic conductive silicon steels form a mirror image relationship; on the secondary left magnetic conductive silicon steel, the annular groove for installing the secondary left induction excitation winding coil is on the left side; on the secondary right magnetic conductive silicon steel, the annular groove for installing the secondary right induction excitation winding coil is on the right side; on the secondary left magnetic conductive silicon steel and the secondary right magnetic conductive silicon steel, the annular grooves for installing the secondary left induction excitation winding coil and the secondary right induction excitation winding coil respectively correspond to the annular grooves for installing the primary left excitation winding coil and the primary right excitation winding coil; the secondary left induction excitation winding coil and the secondary right induction excitation winding coil are respectively installed in the annular grooves on the secondary left magnetic conductive silicon steel and the secondary right magnetic conductive silicon steel; the positions of the through grooves on the secondary left magnetic conductive silicon steel and the secondary right magnetic conductive silicon steel are corresponding; the secondary output force winding coils are respectively wound on the cuboid columns of each silicon steel piece through the corresponding through grooves to form a plurality of groups of secondary output force winding coils;

(3) the independent motor unit in the multi-side arrangement form the multi-side arrangement form comprises a combination of the one-side arrangement form and the one-side arrangement form, a combination of the one-side arrangement form and the symmetrical arrangement form, and a combination of the symmetrical arrangement form and the symmetrical arrangement form.

15. The linear-type induction servo motor with a constant-output-force by using uniform magnetic fields according to claim 14, wherein, three measures are taken to control the current magnitude in the secondary output force winding coil:

(1) the size of the air gap between adjacent silicon steel pieces forming the secondary magnetic conductive silicon steel is adjusted;

(2) the magnetic resistance between adjacent silicon steel pieces forming the secondary magnetic conductive silicon steel is adjusted; and (3) the number of turns of the secondary induction excitation winding coil is adjusted.

16. The linear-type induction servo motor with a constant-output-force by using uniform magnetic fields according to claim 13, wherein, measures for realizing control over an output force comprise:

(1) in an operation manner that the frequency of applied alternating voltage is constant, the output force is controlled only by adjusting the voltage magnitude;

(2) in an operation manner that the magnitude of applied alternating voltage is constant, the output force is controlled only by adjusting the voltage frequency; and (3) the output force is controlled by adjusting the magnitude or frequency of the applied voltage; an important feature is that: when the motor is operated in the operation manner that the frequency of applied alternating voltage is constant, under the conditions that the magnetic induction intensity of the primary magnetic conductive silicon steel and the secondary magnetic conductive silicon steel is unsaturated and the resistance of winding coils is neglected, the output force of the motor is in direct proportion to the magnitude of the applied voltage and is irrelevant to the moving speed of the motor.

17. The linear-type induction servo motor with a constant-output-force by using uniform magnetic fields according to claim 13, wherein, three measures are taken to realize forward driving and reverse driving:

(1) two groups of independent motor units are adopted in the motor; one group realizes forward driving, and the other group realizes reverse driving;

(2) in the independent motor unit, an electromagnetic switch is added to exchange connecting wires of the winding coils in the secondary part; and meanwhile, an induction control apparatus is added to realize control over the electromagnetic switch; and (3) for the independent motor unit in the symmetrical arrangement form, in order to change the current phases of the secondary output force winding coils and realize forward and reverse driving of the motor, two groups of secondary induction excitation winding coils are reversely connected in series to supply power for the secondary output force winding coils, and meanwhile, relative magnitudes of the applied voltage on the primary excitation winding coils are adjusted.

18. The linear-type induction servo motor with a constant-output-force by using uniform magnetic fields according to claim 13, wherein, the primary excitation winding coil and the secondary induction excitation winding coil comprise three structure forms:
(1) the primary magnetic conductive silicon steel or the secondary magnetic conductive silicon steel is regarded as a whole, respectively; a long annular coil with multilayer solenoid type is used as the primary excitation winding coil or the secondary induction excitation winding coil and is installed along the whole of the primary magnetic conductive silicon steel or the secondary magnetic conductive silicon steel;
(2) the primary magnetic conductive silicon steel or the secondary magnetic conductive silicon steel is divided into a plurality of parts, respectively; a combination of a plurality of groups of short coils with multilayer solenoid type is used as the primary excitation winding coil or the secondary induction excitation winding coil, and the short coils are installed independently along each part of the primary magnetic conductive silicon steel or the secondary magnetic conductive silicon steel to replace the long annular coil with multilayer solenoid type; and
(3) the primary excitation winding coil and the secondary induction excitation winding coil adopt a combined form of (1) and (2).

19. The linear-type induction servo motor with a constant-output-force by using uniform magnetic fields according to claim 13, wherein, three measures are taken to control the current magnitude in the secondary output force winding coil:
(1) the size of the air gap between adjacent silicon steel pieces forming the secondary magnetic conductive silicon steel is adjusted;
(2) the magnetic resistance between adjacent silicon steel pieces forming the secondary magnetic conductive silicon steel is adjusted; and
(3) the number of turns of the secondary induction excitation winding coil is adjusted.

\* \* \* \* \*